United States Patent
Schimandle et al.

(10) Patent No.: US 12,398,546 B2
(45) Date of Patent: Aug. 26, 2025

(54) FLUID-DISPENSING SYSTEMS AND METHODS RELATED THERETO

(71) Applicants: Andrew Gilbert Schimandle, Rocklin, CA (US); John Oliver Porteous, Roseville, CA (US); Matthew Dale Wall, Aptos, CA (US)

(72) Inventors: Andrew Gilbert Schimandle, Rocklin, CA (US); John Oliver Porteous, Roseville, CA (US); Matthew Dale Wall, Aptos, CA (US)

( * ) Notice: Subject to any disclaimer, the term of this patent is extended or adjusted under 35 U.S.C. 154(b) by 0 days.

(21) Appl. No.: 18/629,955

(22) Filed: Apr. 9, 2024

(65) Prior Publication Data
US 2024/0271400 A1 Aug. 15, 2024

Related U.S. Application Data

(63) Continuation of application No. 17/052,540, filed as application No. PCT/US2019/031402 on May 9, 2019, now Pat. No. 11,982,075.

(60) Provisional application No. 62/668,822, filed on May 9, 2018.

(51) Int. Cl.
*G05B 15/02* (2006.01)
*E03C 1/05* (2006.01)
*G05D 23/13* (2006.01)

(52) U.S. Cl.
CPC .............. *E03C 1/055* (2013.01); *G05B 15/02* (2013.01); *G05D 23/1393* (2013.01)

(58) Field of Classification Search
CPC ...................................................... E03C 1/055
See application file for complete search history.

(56) References Cited

U.S. PATENT DOCUMENTS

| | | | |
|---|---|---|---|
| 6,446,655 B1 * | 9/2002 | Chang | G05D 23/1353 137/100 |
| 2001/0048811 A1 * | 12/2001 | Waithe | G05D 23/1393 392/475 |
| 2006/0231638 A1 * | 10/2006 | Belz | G05D 23/1393 236/12.12 |
| 2012/0017367 A1 * | 1/2012 | Reeder | E03C 1/057 4/597 |
| 2017/0121952 A1 * | 5/2017 | Hong | G01F 15/003 |

* cited by examiner

*Primary Examiner* — Nathan L Laughlin
(74) *Attorney, Agent, or Firm* — EcoTech Law Group, P.C.

(57) ABSTRACT

Fluid-dispensing systems and methods relating thereto are described. A method of dispensing an output fluid stream includes: (i) receiving a temperature setting for a desired temperature of the output fluid stream and a mechanical disturbance for a desired flow rate of the output fluid stream; (ii) converting each of the temperature setting and the mechanical disturbance to a first valve PWM signal and a second valve PWM signal; (iii) conveying the first PWM signal to a first motor and the second PWM signal to a second motor; and (iv) activating the first motor to open the first valve to produce a first fluid flow at a first fluid flow rate and second motor and the first motor to open the second valve to produce a first fluid flow at a first fluid flow rate. The combination of the first fluid flow and the second fluid flow produces the desired output fluid stream.

8 Claims, 24 Drawing Sheets

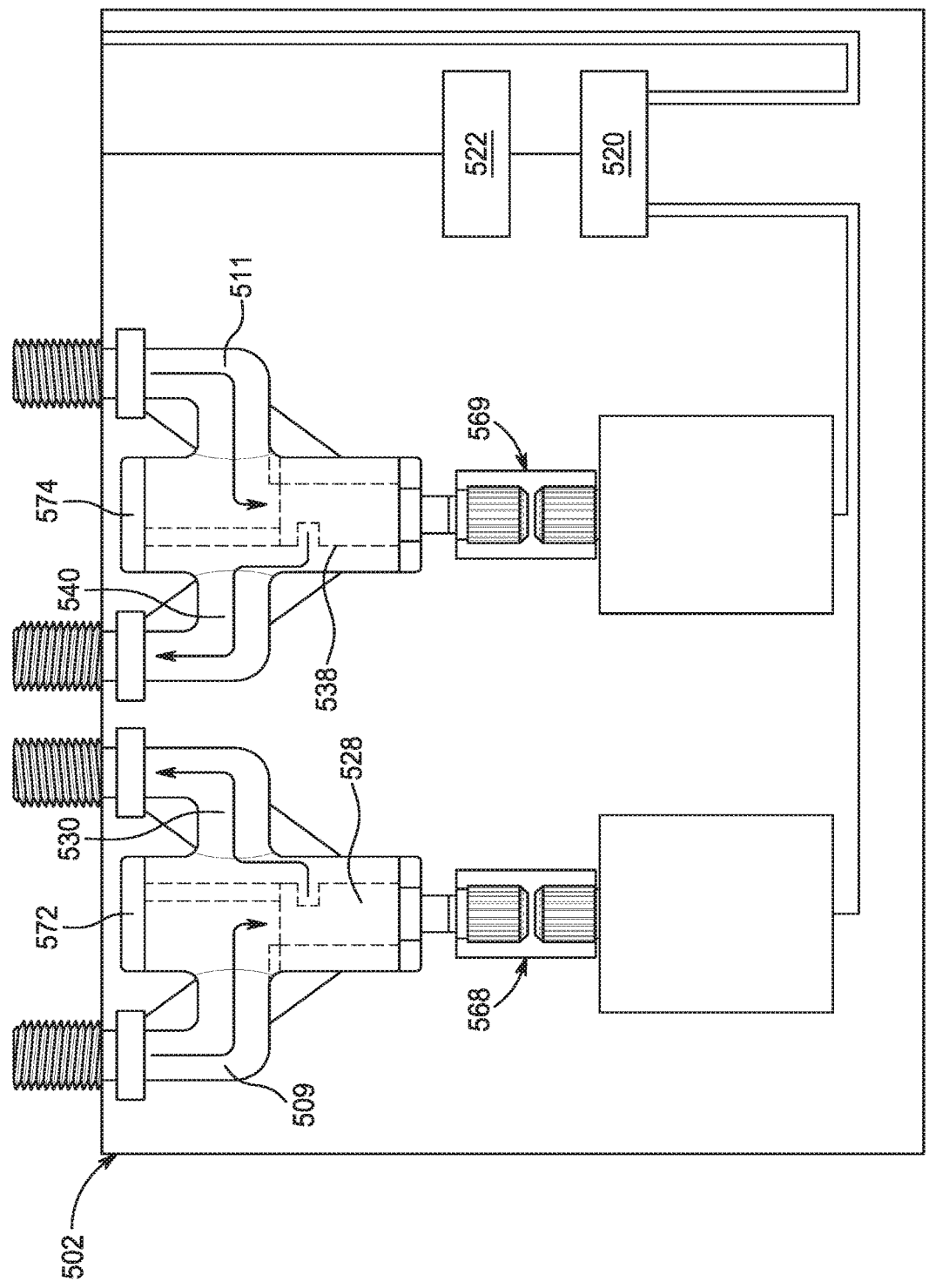

FLUID-DISPENSING SYSTEMS AND METHODS RELATED THERETO

RELATED APPLICATION

The patent application is a Continuation Application of U.S. National Stage Application Ser. No. 17/052,540 filed on Nov. 3, 2020 which further claims priority to International Application No. PCT/US19/31402 filed on May 9, 2019 which further claims priority to U.S. provisional patent application No. 62/668,822 filed on May 9, 2018, which is incorporated herein by reference for all purposes.

FIELD

The present teachings and arrangements relate generally to fluid-dispensing systems. More particularly, the present teachings and arrangements relate to systems and methods for allowing fluid flow at a desired flow rate and at a desired temperature in a hands-free mode of operation along with, if required, the conventional dispensing operation through a faucet.

BACKGROUND

Various fluid-dispensing systems dispense fluid at a desired flow rate and at a desired temperature in a conventional manner, i.e., through a faucet. In such systems, the fluid flow-rate through the faucet is adjusted by using two knobs or a single handle. In the two-knob design, one knob is designated for dispensing cold fluid and the other knob is designated for dispensing hot fluid. In the single-handle design, a single handle is rotated in two different directions, one of which adjusts the fluid flow rate and the other of which adjusts the fluid temperature. Regardless of whether the two-knob design or the single-handle design is used, conventional fluid dispensing systems do not operate in a hands-free mode. There are numerous instances when fluid flow at a desired flow rate and at a desired temperature in a hands-free mode of operation is required along with the conventional dispensing operation through a faucet.

What is, therefore, needed, are improved fluid-dispensing systems and methods that allow hands-free dispensing of fluid at the desired flow rate and temperature.

SUMMARY

To achieve the foregoing, the present teachings provide novel systems and methods for hands-free dispensing of fluid at a desired fluid flow rate and fluid temperature. In one aspect, the present arrangements provide fluid dispensing systems. An exemplar of such fluid dispensing systems includes: (i) a processor, (ii) a first valve first valve pulse width modulation ("PWM") module; (iii) a second valve PWM module; (iv) a PWM timer; (v) a PWM gating timer; (vi) a first valve motor; and (vii) a second valve motor. The processor provides a first valve PWM value and a second valve PWM value.

The first valve PWM value and the second valve PWM value are calculated based on a temperature setting and a mechanical disturbance to produce the output fluid stream having a desired flow rate at a desired temperature. The first valve PWM module generates a first valve PWM control signal that is based on the first valve PWM value and the second valve PWM module generates a second valve PWM control signal that is based on the second valve PWM value. The PWM timer operating, in conjunction with each of the first valve PWM module and the second valve PWM module, generates a first valve PWM waveform and a second PWM waveform, respectively. The gating timer operating, in conjunction with each of the first valve PWM module and the second valve PWM module, to interrupt output of each of the first valve PWM waveform and the second valve PWM waveform to produce the first valve PWM control signal and the second valve PWM control signal, respectively. The first valve motor drives a first valve stem based on the first valve PWM control signal and the second valve motor that drives a second valve stem based on the second valve PWM control signal.

In one embodiment of the present arrangements, the first valve PWM module includes a first valve PWM duty cycle register, a first valve comparator, and a first valve PWM output control, and the second valve PWM module includes a second valve PWM duty cycle register, a second valve comparator, and a second valve PWM output control.

The first valve PWM duty cycle register, in one aspect of the present arrangements, generates, based upon the first valve PWM value, a first valve PWM duty cycle signal. The second valve PWM duty cycle register generates, based upon the second valve PWM value, a second valve PWM duty cycle signal. Each of the first valve comparator and the second valve comparator, operate in conjunction with the PWM timer, to generate the first valve PWM waveform and the second valve PWM waveform, respectively. Each of the first valve PWM output control and the second valve PWM output control, operate in conjunction with the gating timer, to generate the first valve PWM control signal and the second valve PWM control signal, respectively, and wherein the gating timer facilitates interruption to enable or disable output of the first valve PWM waveform from the first valve PWM output control to generate the first valve PWM control signal and enable or disable output of the second valve PWM waveform from the second valve PWM output control to generate the second valve PWM control signal.

In another aspect, the present teachings provide methods of dispensing fluid. An exemplar method of dispensing fluid includes a step (i). This step includes receiving, from a temperature setting device, a desired temperature setting of the output fluid stream. In one embodiment of the present teachings, receiving the desired temperature setting includes receiving a temperature-setting force at the temperature setting device, that is applied by a user desiring the output fluid stream of a desired temperature. The temperature-setting force translates into displacement (e.g., linear, rotational, or angular) of at least a portion of the temperature setting device.

Then, a step (ii) is carried out. This step includes converting, using a temperature encoder, the desired temperature setting to a temperature count value, wherein the temperature encoder is communicatively coupled to the temperature setting device. In one embodiment of the present teachings, receiving the desired flow rate setting includes receiving a flow-rate setting force at the flow rate setting device, that is applied by a user desiring the output fluid stream of a desired flow rate. The flow rate-setting force translates into displacement of at least a portion of the flow rate setting device.

Contemporaneously or following step (i), a step (iii) is carried out and includes receiving, from a flow rate setting device, a desired flow rate setting of the output fluid stream.

Following step (iii), a step (iv) includes converting, using a flow rate encoder, the desired flow rate setting to a flow rate count value, wherein the flow rate encoder is communicatively coupled to the flow rate setting device.

Next, a step (v) includes computing, using a processor and based upon the temperature count value and the flow rate count value, a first valve pulse width modulation value ("PWM") and a second valve PWM value.

Then a step (vi) includes translating the first valve PWM value to a first PWM signal and the second valve PWM value to a second PWM signal.

Following step (vi), a step (vii) includes conveying the first PWM signal to a first motor. The first motor is configured to activate a first valve to dispense, based on the PWM signal, a first fluid flow at a first fluid flow rate.

Next, a step (viii) includes conveying the second PWM signal to a second motor. The second motor is configured to activate a second valve to dispense, based on the second PWM signal, a second fluid flow at a second fluid flow rate.

In one embodiment of the present teachings, the method for dispensing an output fluid stream further includes: (i) activating, using the first PWM signal, a first motor to open a first valve to produce the first fluid flow at the first fluid flow rate; and (ii) activating, using the second PWM signal, a second motor to open a second valve to produce the second fluid flow at the second fluid flow rate.

In another embodiment of the present teachings, the method for dispensing an output fluid stream further includes: (i) mixing the first fluid flow at the first fluid flow rate and the second fluid flow at the second fluid flow rate to produce the output fluid stream; and (ii) dispensing the output fluid stream at the desired temperature and at the desired flow rate, and wherein temperature of the first fluid flow is not the same as that of the second fluid flow.

In one aspect of the present teachings, converting the desired flow rate setting to the flow rate count value includes: (i) identifying, using the flow rate encoder, a degree of rotational or an angular displacement of at least a portion of the flow rate setting device from a reference location; and (ii) converting the degree of rotational or the angular displacement to the flow rate count value by multiplying the degree of rotational or angular displacement and a ratio of total count value to 360 degrees, wherein the total count value corresponds to a count value realized when the angular displacement equals 360 degrees.

In another aspect of the present teachings, converting the desired temperature setting to the temperature count value includes: (i) identifying, using the temperature encoder, a degree of rotational or an angular displacement of at least a portion of the temperature setting device from a reference location; and (ii) converting the degree of rotational or the angular displacement to the temperature count value by multiplying the degree of rotational or angular displacement and a ratio of total count value to 360 degrees, wherein the total count value corresponds to a count value realized when the angular displacement equals 360 degrees.

In yet another embodiment of the present teaching, computing includes: (i) obtaining a temperature count per step value and a flow rate count per step value; (ii) dividing the temperature count value, using a processor, by the temperature count per step value to generate a temperature step value; (iii) dividing the flow rate count value, using a processor, by the flow rate count per step value to generate a flow rate step value; and (iv) determining, using a look-up table, the first valve PWM value and the second valve PWM value, wherein the look-up table provides a correlation between the temperature step value, the flow rate step value, the first valve PWM and the second valve pulse PWM value such that for a selected temperature step value and a selected flow rate step value, the look-up table provides a resulting first valve PWM value and a resulting second valve PWM value.

A method obtaining the temperature count per step value and the flow rate count per step value includes a step (i). This step (i) includes obtaining a full-scale count range of temperature values and a total number of temperature step values for the temperature encoder. The full-scale count range of temperature values is divided into a predetermined number of individual temperature step values such that addition of each of the individual temperature step values results in the total number of temperature step values.

Next, a step (ii) includes obtaining a full-scale count range of flow rate values and a total number of flow rate step values for the flow rate encoder. The full-scale count range of flow rate values is divided into a predetermined number of individual flow rate step values such that addition of each of the individual flow rate step values results in the total number of flow rate step values.

A step (iii) includes dividing full-scale count range of temperature values by the total number of temperature step values to arrive at a flow rate counts per step value and a step (iv) includes dividing full-scale count range of flow rate values by the total number of flow rate step values to arrive at a temperature counts per step value.

Following step (iv), a step (v) includes dividing the temperature count value by the temperature counts per step value to arrive at the temperature count per step value; and a step (vi) includes dividing the flow rate count value by the flow counts per step value to arrive at the temperature count per step value.

Another exemplar method for dispensing an output fluid stream includes: a step (i) including receiving a temperature setting for a desired temperature of the output fluid stream and a mechanical disturbance for a desired flow rate of the output fluid stream.

A step (ii) includes converting each of the temperature setting and the mechanical disturbance to a first valve PWM value that is associated with a first valve and a second valve PWM value that is associated with a second valve. The first valve allows flow of a first input fluid stream having a first temperature and the second valve allows flow of a second input fluid stream having a second temperature. In one embodiment of the present teachings, each of the temperature setting and the mechanical disturbance to the first valve PWM value and the second PWM value is carried out using a PWM look-up table that provides a correlation between values of the temperature setting, the mechanical disturbance, the first valve PWM value and the second PWM value. Preferably, the first temperature is different from the second temperature.

Next, a step (iii) includes generating, using a first valve PWM duty cycle register and a second valve PWM duty cycle register and based upon the first valve PWM value and the second valve PWM value, a first valve PWM duty cycle signal and a second valve PWM duty cycle signal. In one embodiment of the present teachings, each of the first valve PWM duty cycle signal and the second valve PWM duty cycle signal includes an ON time initiation value and an OFF time deactivation value. The ON time initiation value indicates when power from a power supply is active and the OFF time deactivation value indicates when power from the power supply is not active.

Then, a step (iv) includes comparing, using a comparator, each of the first valve PWM value and the second valve PWM value with a time counting register, which resides on a PWM timer, to implement the first valve PWM duty cycle signal as a first valve PWM waveform and the second valve PWM duty cycle signal as a second valve PWM waveform.

Following step (v), a step (vi) includes interrupting, using a gating timer, a first valve PWM output control and a second valve PWM output control, output of the first valve PWM waveform to produce a filtered first valve control signal and output of the second valve PWM waveform to produce a filtered second valve control signal. In one embodiment of the present teachings, the gating timer facilitates interruption to enable or disable output of the first valve PWM waveform from the first valve PWM output control and output of the second valve PWM waveform from the second valve PWM output control. In another embodiment of the present teachings, interrupting produces the filtered first valve control signal having a first signal period that includes a single pulse from the first valve PWM waveform and produces the filtered second valve control signal having a second signal period that includes a single pulse from the second valve PWM wave.

Then, a step (vii) is carried out. This step (vii) includes implementing the filtered first valve control signal to displace a first valve stem associated with the first valve and the filtered second valve control signal to displace a second valve stem associated with the second valve, wherein the implementing allows flow of the first fluid stream and/or the second fluid stream.

Finally, a step (viii) includes dispensing the output fluid stream having the desired temperature and the desired flow rate, wherein the output fluid stream includes the first fluid stream and/or the second fluid stream.

In one aspect of the present teachings, the method for dispensing an output fluid stream further includes transmitting the first valve PWM waveform to a first motor and transmitting the second valve PWM waveform to a second motor. The first motor drives the first valve stem and the second motor drives the second valve stem.

In one embodiment of the present teachings, the desired temperature is a value that equals the first temperature or equals the second temperature or lies between the first temperature and the second temperature.

In another embodiment of the present teachings, when the gating timer facilitates disablement of output from the first valve PWM output control and disablement of output from the second valve PWM output control, and method for dispensing the output fluid stream further comprises calculating, using a processor, another first valve PWM value and another second valve PWM value based upon same or different temperature setting for same or different desired temperature of the output fluid stream and same or different mechanical disturbance for the desired flow rate of the output fluid stream. Preferably, the present teachings include writing another first valve PWM value to the first valve PWM duty cycle register, and writing another second valve PWM value to said second valve PWM value.

In one aspect, the present teachings provide that a counting period of the gating timer is offset than that of the PWM timer such that a time of initiation of counting under the gating timer is different from that under the PWM timer.

In another aspect, the present teachings provide that during step (v) a counting period of the PWM timer will not extend beyond that of the gating timer such that the gating timer disables a portion of the first valve PWM waveform and a portion of the second valve PWM waveform that are generated based on the PWM timer.

The system and method of operation of the present teachings and arrangements, however, together with additional objects and advantages thereof, will be best understood from the following descriptions of specific embodiments when read in connection with the accompanying figures.

BRIEF DESCRIPTION OF THE DRAWINGS

FIG. 5 shows a schematic view of the fluid control system shown in FIG. 4, according to one embodiment of the present arrangements.

DETAILED DESCRIPTION OF THE PREFERRED EMBODIMENTS

In the following description, numerous specific details are set forth in order to provide a thorough understanding of the present teaching and arrangements. It will be apparent, however, to one skilled in the art that the present teaching and arrangements may be practiced without limitation to some or all of these specific details. In other instances, well-known process steps have not been described in detail in order to not unnecessarily obscure the present teachings and arrangements.

The present arrangements and methods provide control of flow rate and/or temperature of fluid exiting a fluid-dispensing feature (e.g., a faucet) independent of hand-operated control of flow rate of fluid and fluid temperature. In one embodiment, the present arrangements provide systems for hands-free control of fluid flow rate and/or temperature using one or more devices (e.g., flow rate controller 106 and temperature controller 116 of FIG. 1A) located remote from a faucet in one operative state, but allows hand-operated control of fluid flow rate and/or temperature in another operative state. In this embodiment, use of the term "remote" conveys that the device is located a distance away from the faucet. Furthermore, each remote device may be any apparatus that, when activated, controls the flow rate and/or temperature of the dispensed fluid. The present arrangements allow a user to complete everyday tasks (e.g., washing hands and dishes, and cleaning food) more quickly, more easily, and with improved hygiene over the conventional fluid dispensing systems (e.g., hand operated and touch or motion sensor enabled control of fluid temperature and fluid flow rate). By way of example, the systems of the present arrangements allow for near instantaneous starting and stopping of the flow of fluid in a hands-free manner. The user, without removing or disengaging their hands from the task in which the user is engaged, is able to quickly turn on and off the fluid flow dispensed from the fluid-dispensing feature. This allows near instantaneous control of fluid flow, minimizes fluid waste that occurs in conventional fluid dispensing systems when the user disengages from the task being performed to turn on or off the fluid flow. Where sensors are used in conventional fluid dispensing system, fluid waste occurs during an activation and deactivation sensor delays. Furthermore, the fluid-dispensing systems of the present arrangements, allow the user to adjust fluid flow rate in a hands-free manner to provide only the amount of fluid flow necessary for a given task, thus reducing fluid waste and increasing fluid savings.

Figure 1A:
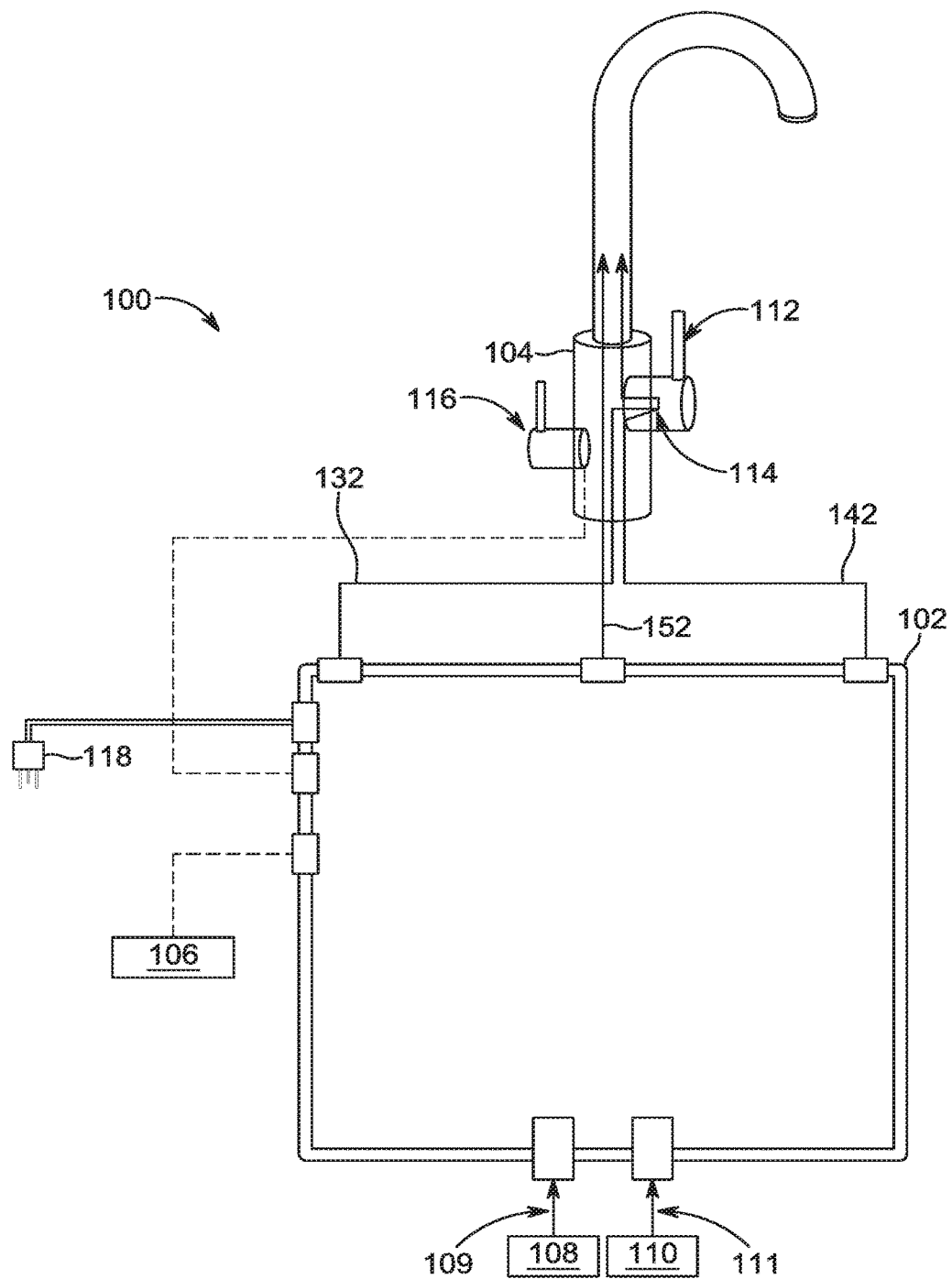
FIG. 1A shows a schematic view of a fluid-dispensing system, according to one embodiment of the present arrangements and that includes a faucet, a fluid control system, and a flow rate controller.

FIG. 1A shows a fluid-dispensing system 100, according to one embodiment of the present arrangements. Fluid-dispensing system 100 includes a fluid control system 102 communicatively coupled to a faucet 104 and a flow rate controller 106. Fluid control system 102 receives a fluid of a first temperature (hereafter also referred to as a "hot fluid") and a fluid of a second temperature (hereinafter also referred to as a "cold fluid") from a fluid source of a first temperature (hereafter referred to as a "hot fluid source") 108 and a fluid source of a second temperature (hereinafter referred to as a "cold fluid source") 110, respectively. A conduit of a first fluid temperature (hereinafter referred to as a "hot fluid conduit") 109 and a conduit of a second fluid temperature (hereinafter referred to as a "cold fluid conduit") 111 couples hot fluid source 108 and cold fluid source 110, respectively, to fluid control system 102. Hot fluid source 108 and cold fluid source 110 may be from any source that provides hot and cold fluid. By way of example, hot and cold fluid may be from a building's plumbing system or from on demand or tankless fluid heater.

Fluid control system 102 transmits multiple fluid flows, via conduits, to faucet 104. By way of example, a faucet conduit of a first fluid temperature (hereinafter referred to as a "first faucet conduit") 132 transmits hot fluid from fluid control system 102 to faucet 104. Similarly, a faucet conduit of a second fluid temperature (hereinafter referred to as a "second faucet conduit") 142 transmits cold fluid from fluid control system 102 to faucet 104. The hot and cold fluid are admixed in a mechanical temperature component 114. A faucet temperature controller 112 adjusts the ratio of hot and cold fluid received in mechanical temperature component 114 from first faucet conduit 132 and second faucet conduit 142. Thus, the temperature of the fluid flow exiting faucet 104 may be adjusted by increasing or decreasing the fluid flow rate of the hot and/or cold fluid streams. A faucet flow controller (not shown to simplify illustration) coupled to a mixing cartridge may be engaged to start, stop, or adjust flow rate of the admixed fluid stream exiting out of the faucet.

In addition to first faucet conduit 132 and second faucet conduit 142, an admixed fluid conduit 152 transmits admixed fluid from fluid control system 102 to faucet 104. Admixed fluid conduit 152 provides admixed fluid to faucet 104 that is independent of first faucet conduit 132 and second faucet conduit 142. As will be discussed in greater detail below with respect to FIG. 1D, the flow rate and temperature of the admixed fluid in admixed fluid conduit 152 is not controlled by faucet temperature controller 112 or a faucet's control adjusting means. Rather, temperature and flow rate of the admixed fluid is controlled by inputs from flow rate controller 106 alone or flow rate controller 106 in conjunction with temperature controller 116.

Temperature controller 116 may include a temperature encoder (e.g., an optical, capacitive, or magnetic rotary encoder) that translates movement (e.g., degree of rotation) of temperature controller 116 into electronic information that is received by fluid control system 102. Preferably, temperature controller 116 is in close proximity to faucet 104 to allow a user to quickly change the temperature as needed and to provide an immediate visual recognition of the current temperature setting. More preferably, temperature controller 116 is coupled to faucet 104.

Fluid control system 102 is also capable of receiving information from flow rate controller 106, which includes a force-receiving feature (e.g., pressure plate 776 of FIG. 7) that allows a user to exert a force to request a desired fluid flow rate from faucet 104. In one embodiment of the present arrangements, a flow rate encoder (e.g., encoder 1010 of FIG. 10) translates the force exerted by the user on the force-receiving feature (e.g., force-receiving feature 1076 of FIG. 10) to electronic information that is transmitted to fluid control system 102. In another embodiment of the present arrangements, a force-sensing resistor (e.g., force-sensing resister 788 of FIG. 7B) or a force-sensing linear potentiometer (e.g., force-sensing linear potentiometer 994 of FIG. 9B) translates the force exerted by a user to electronic information that is transmitted to fluid control system 102. A wired and/or wireless connection allows flow rate controller 106 to transmit information related to a fluid flow rate and/or fluid temperature to fluid control system 102. Preferably, flow rate controller 106 is mounted in a position that can be contacted by a user. More preferably, flow rate controller 106 is located close to the ground in close proximity to a foot of a user and far away from faucet 104 where a fluid stream is dispensed.

Figure 1B:
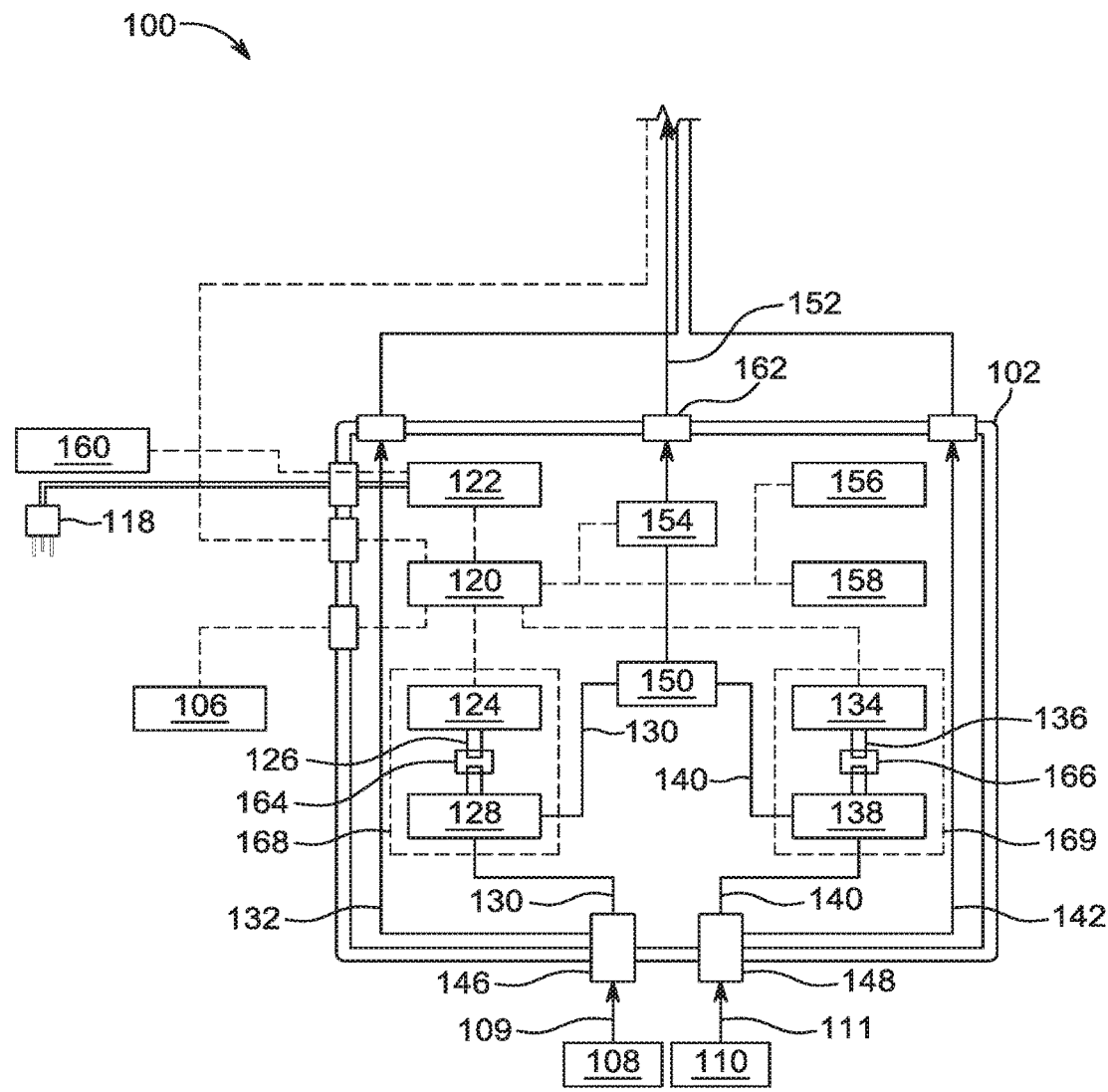
FIG. 1B shows a schematic view of the fluid control system of FIG. 1A, according to one embodiment of the present arrangements.

FIG. 1B shows a schematic of fluid control system 102 of FIG. 1A, according to one embodiment of the present teachings. Preferably, fluid control system 102 is housed inside a faucet cabinet or in any cabinet located in proximity to the faucet. Fluid control system 102 includes a computing device (hereinafter a "computer") 120, which receives power from a power supply 122. A battery system 160 and/or an electrical plug 118 provide power to power supply 122. Computer 120 receives information from flow rate controller 106 and/or temperature controller 116 regarding a desired fluid flow rate and desired fluid temperature and transfers the information to a first motor 124 and a second motor 134. First motor 124 and second motor 134 are configured to engage a corresponding first valve stem 126 and second valve stem 136 respectively. Thus, first motor 124 and second motor 134, in one embodiment of the present arrangements, engage first valve stem 126 and second valve stem 136, respectively, to block or open a first valve 128 and a second valve 138, respectively. In one preferred embodiment of the present arrangements, first motor 124 and second motor 134 are servomotors.

A first valve coupler 164 couples first motor 124 to first valve stem 126 and second motor 134. In an assembled configuration, first motor 124, the first valve coupler 164, first valve stem 126, and first valve 128 is hereinafter also referred to as a first valve subassembly 168. Similarly, a second valve coupler 166 couples second motor 134 to second valve stem 136. In an assembled configuration, second motor 134, second valve coupler 166, second valve stem 136, and second valve 138 is hereinafter also referred to as a second valve subassembly 169. In this configuration, first motor 124 is only associated with first valve stem 126, and not second valve stem 136. Similarly, second motor 134 is only associated with second valve stem 136, and not first valve stem 126. Thus, first motor 124 of first valve subassembly 168 only drives first valve 128 and second motor 134 of second valve subassembly 169 only drives second valve 138.

Engagement of first valve stem 126 by first motor 124 blocks or creates a fluidic pathway defined between a valve inlet and a valve outlet of a first valve 128 and engagement of second valve stem 136 by second motor 134 blocks or creates a fluidic pathway defined between a valve inlet and a valve outlet of second valve 138. In another embodiment of the present arrangements, first valve 128 and second valve 138 are rotary valves. Each rotary valve includes one or more ceramic discs, each disc having defined therein an aperture through which fluid may traverse. The disc may be rotated to obstruct and/or create the fluidic pathway through the valve. During one operative state of fluid control system 102, first valve stem 126 and second valve stem 136 may rotate a valve disc to a position where the disc aperture is in complete alignment, partial alignment or out of alignment with the fluidic pathway through first valve 128 or second valve 138. Thus, fluid that passes through valves 128 or 138 is partially or completely blocked. If the disc aperture is partially aligned with the fluidic pathway of first valve 128 or second valve 138, then a reduced or increased flow rate through valve 128 or 138 is realized.

First splitter 146 receives hot fluid from hot fluid conduit 109 and transmits the hot fluid to mechanical temperature component 112 or first valve 128. More particularly, a first dispensing end of first splitter 146 is coupled, using a first faucet conduit 132, to mechanical temperature component 114 and a second dispensing end is coupled, using a first valve conduit 130, to first valve 128.

Second splitter 148 receives cold fluid from cold fluid conduit 111 and transmits the cold fluid to mechanical temperature component 114 or second valve 138. A first dispensing end of second splitter 148 is coupled, using a second faucet conduit 142, to mechanical temperature component 114 and the second dispensing end is coupled, using second valve conduit 140, to second valve 138.

Junction 150 is coupled to and designed to receive hot fluid from first valve 128 and cold fluid from second valve 138 to create and admixed fluid flow. Admixed fluid conduit 152 may receive the admixed fluid flow from junction 150 and transmits the admixed fluid flow to faucet 104. In one embodiment of the present arrangements, admixed fluid conduit 152 is coupled to an emergency shutoff valve 154, which in certain predetermined instances prevents the admixed fluid from being transmitted to faucet 104. By way of example, shutoff valve 154 may prevent flow to faucet 104 in the event of a power failure when valves 128 and 138 are open and fluid flow is passing through them. Preferably, shutoff valve 154 is a normally closed solenoid valve. When the power is off to fluid control system 102, shutoff valve 154 will automatically move into a closed position to prevent the flow of fluid. Shutoff valve 154 may also be instructed by computer 120 to close if computer 120 detects a motor or valve failure.

Fluid control system 102 may also include a wireless transmitter 156 (e.g., Wi-Fi, Bluetooth, or Near Field Communication ("NFC")) to transmit and/or receive information to another device, such as a mobile device. Fluid control system 102 may also include a leak detection sensor 158 to determine if there is a leak within fluid control system 102. In one embodiment of the present arrangements, if a leak is detected by leak detection sensor 158, computer 120 instructs emergency shutoff valve 154 to engage to prevent admixed fluid flow to faucet 104.

Preferably, one or more connecting components (e.g., male and female thread components) 162 allows fluid conduits internal to fluid control system 102 to connect complimentary conduits that are external to the same fluid control system. By way of example, connecting component 162 couples an internal portion to an external portion of the same admixed fluid conduit 152.

In one embodiment of the present arrangements, fluid control system 102 includes a housing (e.g., housing 344 of FIGS. 3A and 3B) designed to enclose the components described above. Preferably, the housing is made of a fluid-proof housing and includes external multi-colored LED health indicator lights that a user can view on the outside of the housing to verify if fluid-dispensing system 100 is functioning properly (e.g., verify if first motor is working properly and rotating first valve).

Figure 1C:
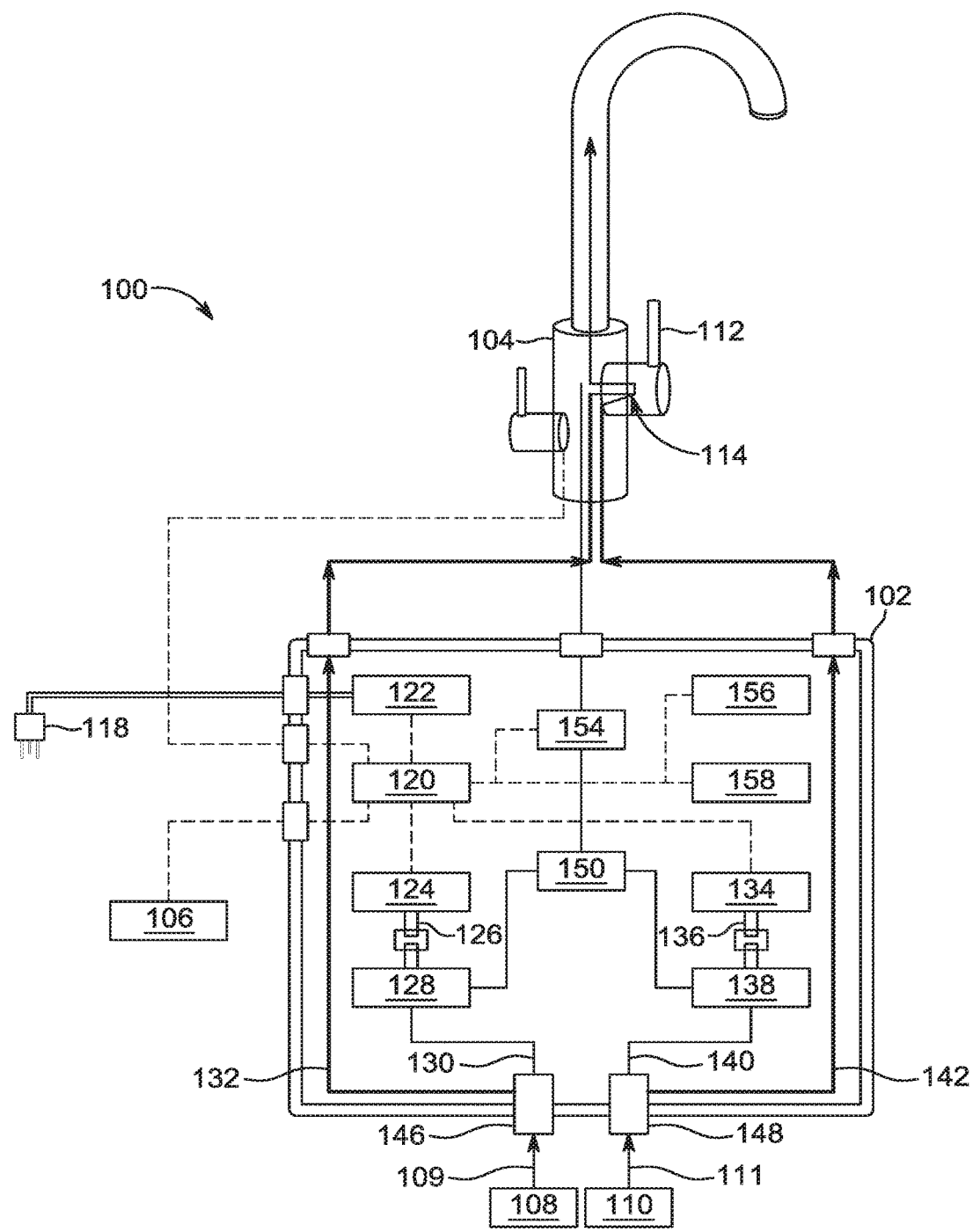
FIG. 1C shows a fluid flow path, according to one embodiment of the present arrangements, within the fluid control system of FIG. 1B.

FIG. 1C shows the fluid-dispensing system 100 of FIG. 1A in an operative state, according to one embodiment of the present arrangements. In this embodiment, flow rate controller 106 is not engaged and faucet 104 receives and dispenses fluid at a desired flow rate and desired temperature (i.e., receiving hot fluid from a first faucet conduit 132 and cold fluid from a second faucet conduit 142, mixing the hot and cold fluid, and dispensing the hot/cold fluid). In this operational state of fluid-dispensing system 100, by default, motors 124 and 134 engage with valves 128 and 138, respectively, to prevent any fluid from traversing through valves 128 and 138, respectively. As a result, the hot fluid received by first splitter 146 is transferred to first faucet conduit 132 and the cold fluid received by second splitter 148 is transferred to second faucet conduit 142. Mechanical temperature component 114, in faucet 104, admixes the hot and cold fluid and a mixing cartridge dispenses the admixed fluid according to the flow rate set by a flow adjusting means and the temperature set by faucet temperature-control mechanism 112.

Figure 1D:
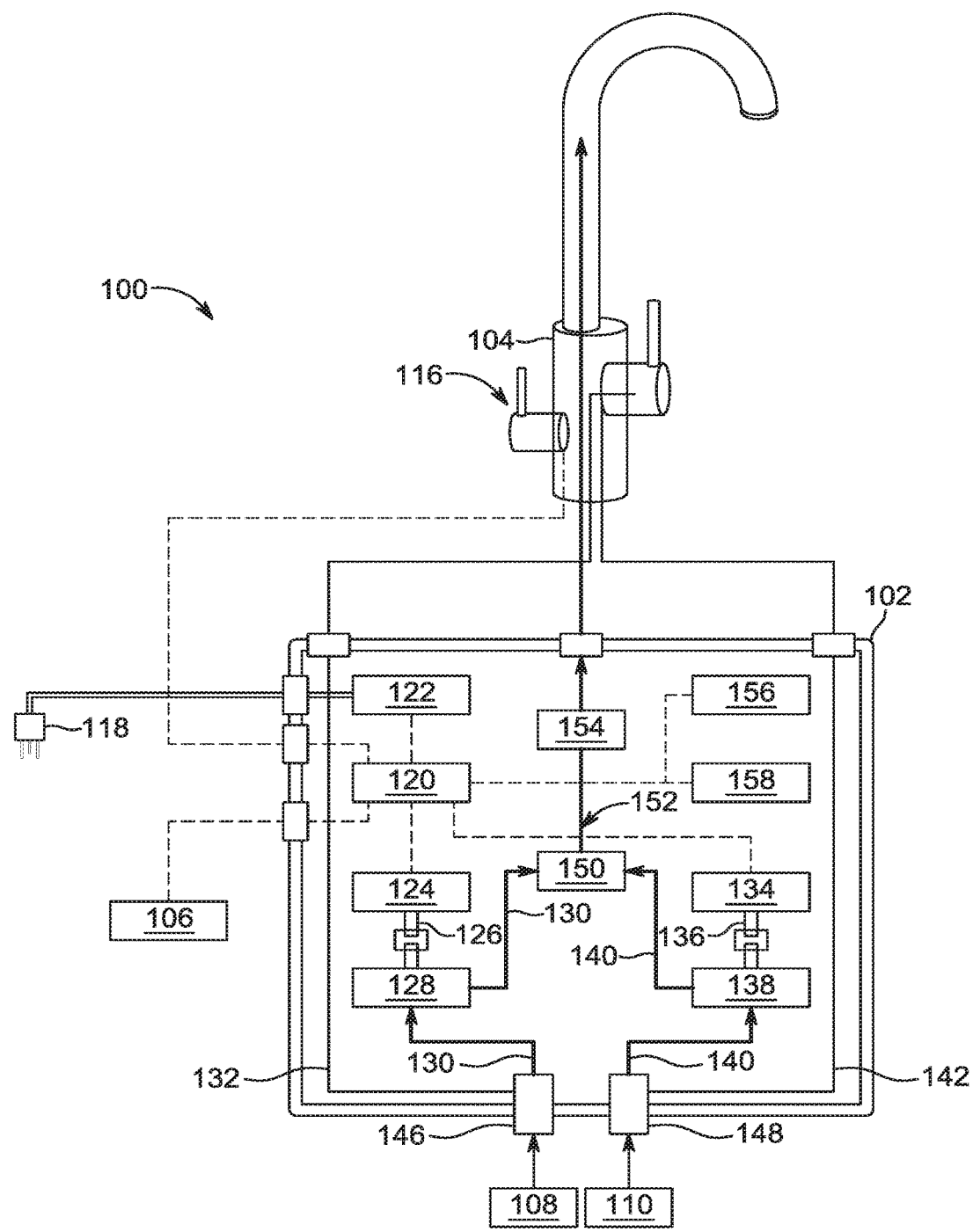
FIG. 1D shows another fluid flow path, according to another embodiment of the present arrangements, within the fluid control system of FIG. 1B.

FIG. 1D shows another operative state of fluid-dispensing system 100 of FIG. 1A, according to one embodiment of the present arrangements. In this embodiment, flow rate controller 106 is engaged by a user to control flow rate of fluid exiting faucet 104. This allows a user to quickly and easily turn on, turn off, and adjust the fluid flow rate in a hands-free mode. Computer 120 receives temperature information from temperature controller 116, indicating a desired temperature for a fluid stream dispensed from faucet 104. Computer 120 also receives flow rate information (hereinafter also referred to as a "flow rate signal") from flow rate controller 106, indicating a desired flow rate for the fluid stream. As will be discussed in greater detail below, using the temperature information and flow rate information, computer 120 determines how much power should be sent to first motor 124 and second motor 134 to obtain a fluid stream of the appropriate temperature and flow rate. Computer 120 determines a hot fluid flow rate and a cold fluid flow rate that, when combined, create the appropriate temperature and flow rate from faucet 104.

Computer 120 transfers information regarding an amount of motor power to motors 124 and 134, which opens valves 128 and 138, respectively, to achieve the appropriate flow rates of hot and cold fluid. In this operative state of fluid-dispensing system 100, the flow adjusting means and temperature controller 112 of the faucet are not engaged. Thus, hot fluid and cold fluid do not flow through first faucet conduit 132 and second faucet conduit 142 to faucet 104. Rather, hot fluid received by first splitter 146 is transmitted, through first valve conduit 130, to first valve 128, and hot fluid received by second splitter 148 is transmitted, through second valve conduit 140, to second valve 138.

Hot and cold fluid transferred through first and second valves 128 and 138, respectively, are received by junction 150 and then transmitted to faucet 104 through admixed fluid conduit 152 at the appropriate temperature and flow rate.

In another embodiment of the present arrangements, when flow rate controller 106 is engaged to control fluid flow rate, a user controls temperature of the fluid stream with temperature controller 116 or flow rate controller 106. In this configuration, foot flow rate controller 106 controls both fluid flow rate and fluid temperature. As will be discussed in greater detail below with respect to FIGS. 8A, 8B, 9A, and 9B, a user may adjust a fluid temperature using flow rate controller 106 by applying pressure to different locations on a contacting surface (e.g., contacting surface 882 of FIG. 8) of flow rate controller 106. Computer 120 receives flow rate and temperature information from flow rate controller 106, indicating a desired flow rate and temperature for the fluid stream and transmits that information to first motor 124 and second motor 134 to obtain the desired flow rate and temperature.

The present teachings recognize that fluid-dispensing system 100 may be used in various environments (e.g., kitchen or bathroom), though a location to install fluid control system 102 within each environment may be limited. To this end, the present teachings provide two embodiments of fluid control system 102, as shown and described in FIG. 2 and FIGS. 3A and 3B. Each configuration allows for installation of fluid control system 102 depending on space available for installation. Furthermore, these configurations include a fluid manifold that directs fluid flow within fluid control system 102 to each valve and/or external conduits. As will be shown below with reference to FIG. 2, the fluid manifold replaces numerous components within fluid control system 102. Such reduction in components simplifies manufacturing because there are fewer components to produce. The fluid manifold also simplifies installation because fewer components are needed to assemble fluid control system 102.

Figure 2:
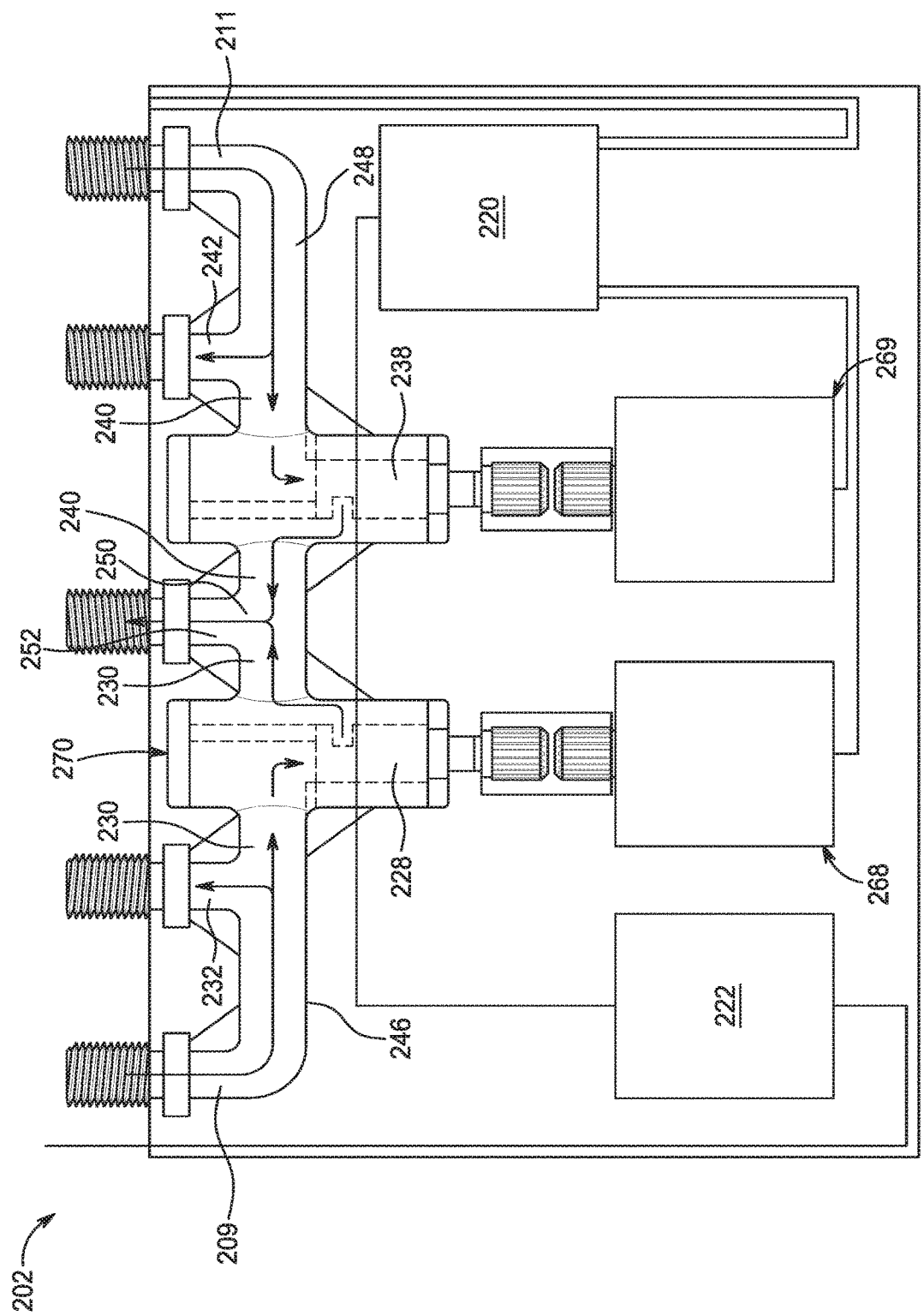
FIG. 2 shows a schematic view of the fluid control system of FIG. 1A, according to another embodiment of the present arrangements and that includes a fluid manifold of a first type.

FIG. 2 shows a fluid control system 202, according to another embodiment of the present arrangements. Fluid control system 202 is substantially similar to fluid control system 102 of FIGS. 1B-D. Fluid control system 202 includes a fluid manifold 270. Fluid manifold 270 has included therein a hot fluid conduit 209, a cold fluid conduit 211, a first valve conduit 230, a first faucet conduit 232, a second valve conduit 240, a second faucet conduit 242, a first splitter 246, second splitter 248, a junction 250, and an admixed fluid conduit 252, which are substantially similar to their counterparts in FIGS. 1B-1D (i.e., hot fluid conduit 109, cold fluid conduit 111, first valve conduit 130, first faucet conduit 132, second valve conduit 140, second faucet conduit 142, first splitter 146, second splitter 148, junction 150, and admixed fluid conduit 152). Furthermore, each conduit, splitter and junction included in fluid manifold 270 functions in a substantially similar manner as its counterpart in FIG. 1. By way of example, first splitter 246 receives hot fluid from hot fluid conduit 209 and directs the hot fluid to first faucet conduit 232 or first valve conduit 230. As a result, when fluid manifold 270 is coupled to a first valve subassembly 268 and a second valve subassembly 269, it receives hot and cold fluid, and dispenses the hot and cold fluid or an admixed fluid to a faucet (e.g., faucet 104 of FIG. 1A).

A computer 220, a power supply 222, first valve subassembly 268 and second valve assembly 269 are substantially similar to their counterparts in FIG. 1B (i.e., computer 120, power supply 122, first valve subassembly 168, and second valve assembly 169). Computer 220 and power supply 222 may be disposed within fluid control system 202 or coupled to an external portion of fluid control system 202.

The design of fluid manifold 270 ensures that fluid control system 202 has a relatively narrow profile. To accomplish this, the conduits of fluid manifold 270 that may be coupled to an external conduit (e.g., hot fluid conduit 209, first faucet conduit 232, first valve conduit 230, admixed fluid conduit 252, second valve conduit 240, second faucet conduit 242, and cold fluid conduit 211) are linearly arranged and extend in the same direction.

Furthermore, first valve subassembly 268 and second valve assembly 269 are also linearly arranged with respect to the conduits of fluid manifold 270 that couple to external conduits. However, in those embodiments where a portion of first valve 228 is coupled to and disposed with fluid manifold 270, first valve subassembly 268 extends in a direction that is opposite (i.e., disposed 180 degrees with respect to) the above-mentioned conduits of fluid manifold 270. Likewise, in those embodiments where a portion of second valve 238 is coupled to and disposed within fluid manifold 270, second valve subassembly 269 extends in the same direction as first valve assembly 268. Thus, rather than extending beyond fluid control system 202, first and second valve subassemblies 268 and 269 extend within fluid control system 202.

The positioning of fluid manifold 270, first valve subassembly 268, and second valve subassembly 268 in a linear arrangement provides for fluid control system 202 that has a relatively narrow profile in one direction. In an assembled configuration, fluid control system 202 couples to external conduits along a single surface of fluid control system 202 and extend in the same linear direction. Thus, coupling the external conduits is made easier by allowing connection to fluid control system 202 along one linear location and reduces the length of external conduit need to couple fluid control system 202 to a faucet and/or hot and cold fluid sources. This narrow profile also allows for installation of fluid control system 202 in locations where there is minimal space between a mounting surface and other object (e.g., existing plumbing) in close proximity to the mounting surface.

Figure 3A:
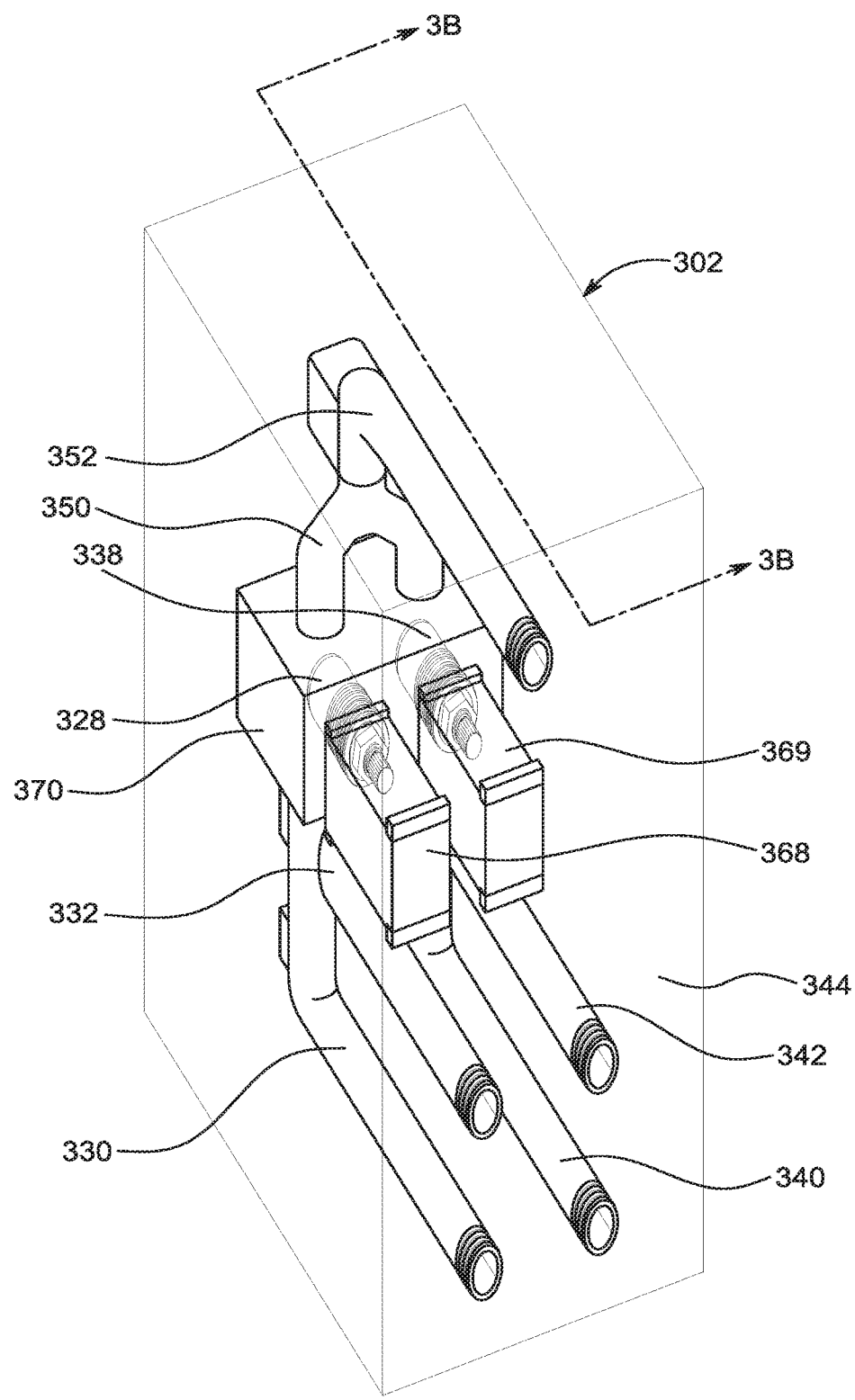
FIG. 3A shows a perspective view of the fluid control system of FIG. 1A, according to yet another embodiment of the present arrangements and that includes a fluid manifold of a second type.
Figure 3B:
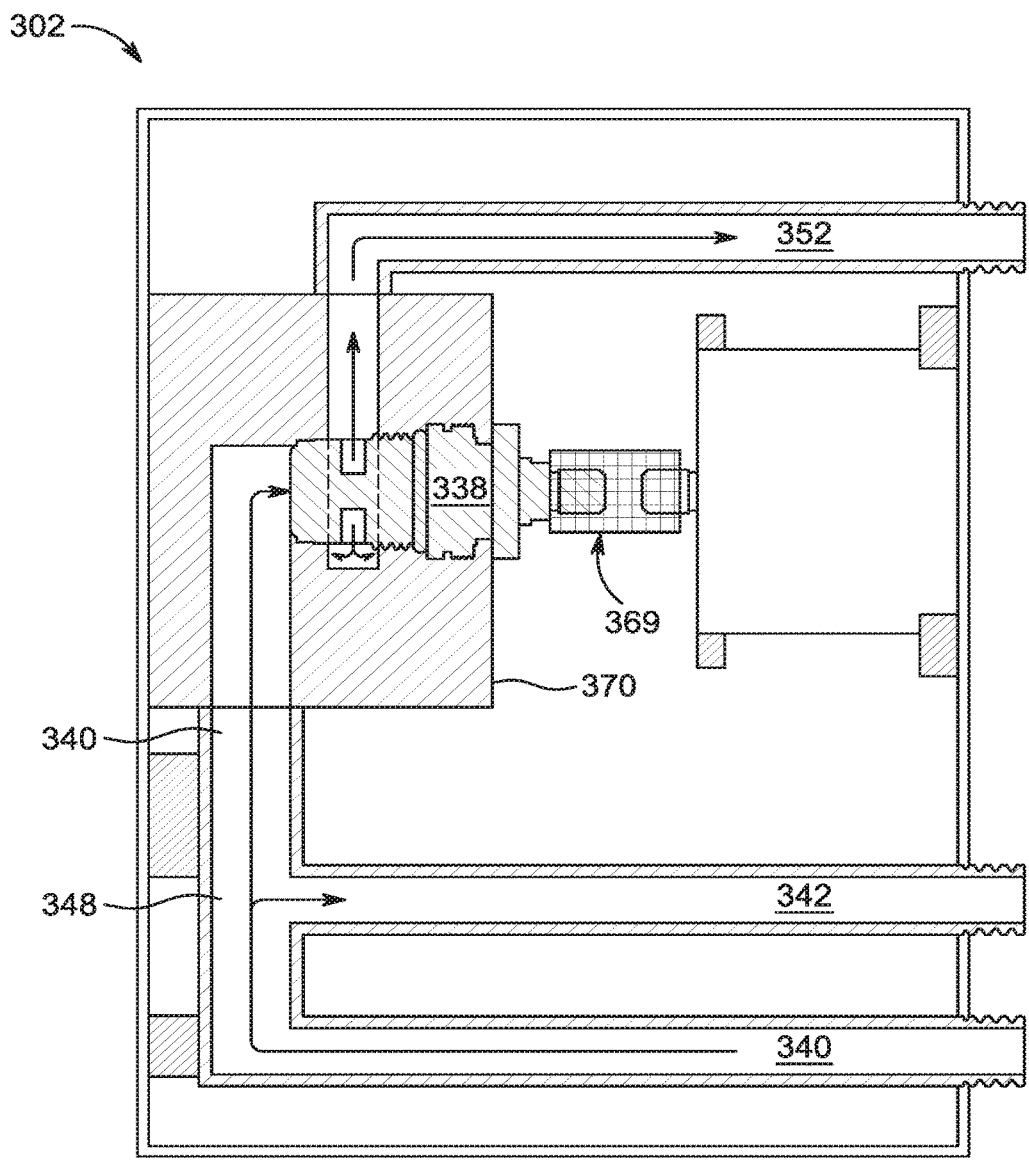
FIG. 3B shows a cross-sectional view of the fluid control system of FIG. 3A.

FIGS. 3A and 3B show a fluid control system 302, according to another embodiment of the present arrangements and that includes a fluid manifold 370 that has a different design than fluid manifold 270 of FIG. 2. Whereas fluid manifold 270 couples to multiple external conduits in a linear alignment, fluid manifold 370 couples to multiple external conduits in nonlinear, compact arrangement.

Fluid manifold 370, which is substantially similar to fluid manifold 270 of FIG. 2, includes a hot fluid conduit 309, a cold fluid conduit 311, a first valve conduit 330, a first faucet conduit 332, a second valve conduit 340, a second faucet conduit 342, a first splitter 346, a second splitter 348, a junction 350, and an admixed fluid conduit 352, which are substantially similar to their counterparts in FIGS. 1B-1D (i.e., hot fluid conduit 109, cold fluid conduit 111, first valve conduit 130, first faucet conduit 132, second valve conduit 140, second faucet conduit 142, first splitter 146, second splitter 148, junction 150, and admixed fluid conduit 152).

In addition to fluid manifold 370, fluid control system 302 includes a housing 344, a first valve subassembly 368 and a second valve subassembly 369 which are substantially similar to their counterparts in FIG. 2 (i.e., housing 244, first valve subassembly 268, and second valve subassembly 269).

In the configuration shown in FIGS. 3A and 3B, first valve subassembly 368, when a portion of first valve 328 is coupled to and disposed within fluid manifold 370, is arranged in close proximity to and extends in the same linear direction as first valve conduit 330, first faucet conduit 332, and admixed fluid conduit 352. Second valve subassembly 369, when a portion of second valve 338 is coupled to and disposed within fluid manifold 370, extends in the same linear direction as second valve conduit 340, second faucet conduit 342, and admixed fluid conduit 352. This configuration creates a compact fluid control system 302. External conduits that may be coupled to fluid control system 302 are similarly arranged adjacent to each other in a compact region. This compact profile allows for installation of fluid control system 302 in locations where there is minimal space between a mounting surface and other object(s) (e.g., existing plumbing) in close proximity to the mounting surface. A power supply and a computer, not shown to simplify illustration, may be secured within housing 344, or on an outside surface of housing 344. In a preferred embodiment of the present arrangements, fluid manifold 370 is 3D printed or cast as a single component. As discussed above, a single component fluid manifold 370 has several production, assembly, and installation advantages.

Figure 4:
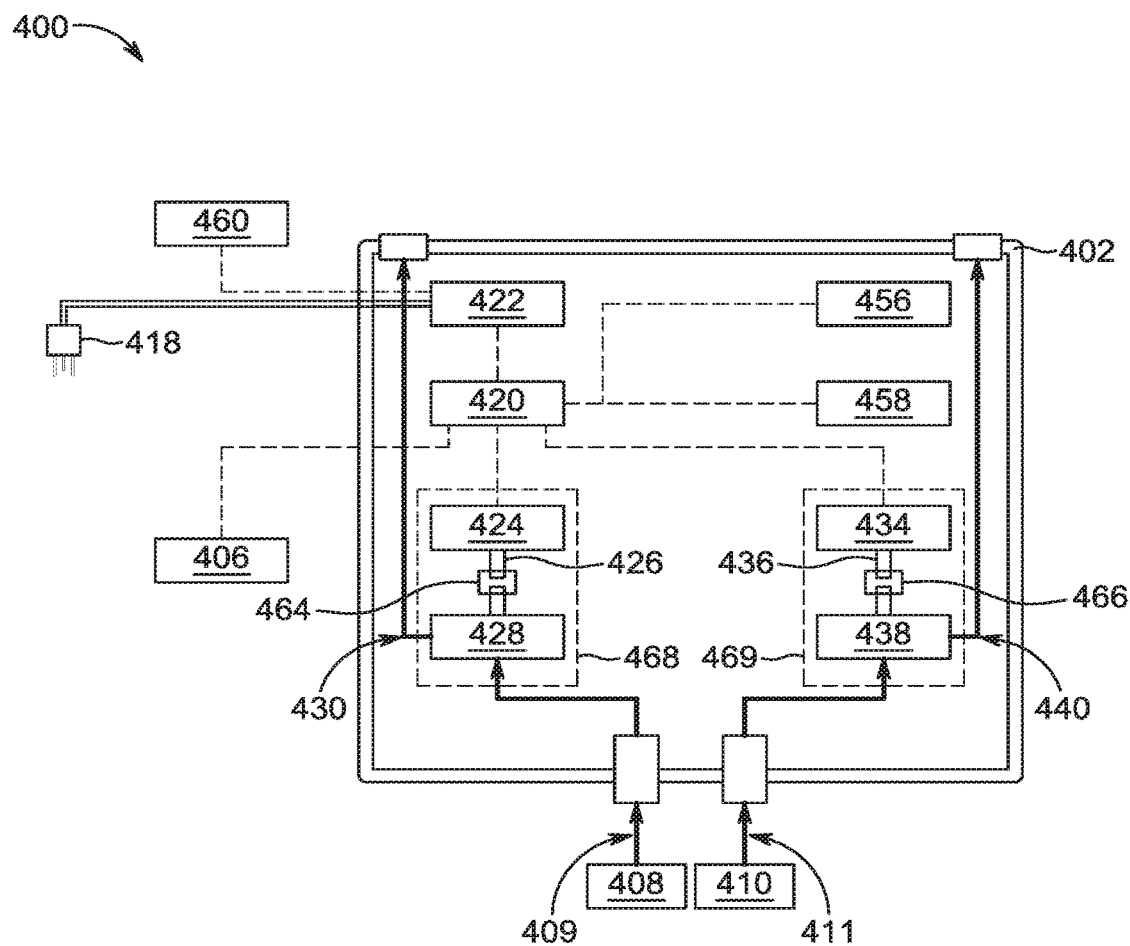
FIG. 4 shows a schematic view of a fluid-dispensing system, according to another embodiment of the present arrangements and that includes a fluid control system and a flow rate controller.

The embodiments shown in FIGS. 1A-1D, 2, and 3A-3B provide a fluid-dispensing system for hands-free control of fluid flow rate and/or temperature using a flow rate controller in one operative state, but also allow for hand-operated control of fluid flow rate and/or temperature in another operative state. Certain embodiments of the present arrangements also provide for hands-free control of flow rate and/or temperature using a flow rate controller only. By way of example, FIG. 4 shows a schematic view of a fluid-dispensing system 400, according to another embodiment of the present arrangements and that includes a fluid control system 402 and a flow rate controller 406.

Unlike fluid-dispensing system 100 of FIG. 1, fluid-dispensing system 400 does not include a faucet. Rather, fluid-dispensing system 400 may be coupled to an existing faucet that does not provide hands-free control of flow rate of fluid exiting the faucet. When coupled to the faucet, fluid-dispensing system 400 provides hands-free control of a flow rate of fluid exiting the faucet.

Fluid control system 402 includes a computer 420, a power supply 422, a first valve subassembly 468 (i.e., a first motor 424, a first valve stem 426, a first coupler 464, and a first valve 428), a second valve subassembly 469 (i.e., a second motor 434, a second valve stem 436, a second coupler 466, and a second valve 438), a wireless transmitter 456, and a leak detection sensor 458, which are substantially similar to their counterparts in FIG. 1B (i.e., computer 120, power supply 122, first valve subassembly 168 (i.e., first motor 124, first valve stem 126, first coupler 164, and first valve 128), second valve subassembly 169 (i.e., second motor 134, second valve stem 136, second coupler 166, and second valve 138), wireless transmitter 156, and leak detection sensor 158).

In a non-operative state of fluid-dispensing system 400, first valve 428 is closed, which blocks, or prevents defining of, a fluidic pathway between hot fluid conduit 409 and first valve conduit 430. Similarly, second valve 438, in a non-operative state, is also closed, which block, or prevents defining of, a fluidic pathway between cold fluid conduit 411 and second valve conduit 440. Thus, during this non-operative state, hot fluid and cold fluid are not transmitted to the coupled faucet.

During an operative state of fluid-dispensing system 400, flow rate controller 406 is engaged by a user. Flow rate controller 406 receives force information from a force-receiving feature (e.g., force-receiving feature 1076 of FIG. 10) and transmits a force signal to fluid control system 402. Computer 420 receives the flow rate signal and facilitates transfer of information regarding an appropriate amount of power to first motor 424 and second motor 434, which opens first valve 428 and second valve 438, respectively. When first valve 428 is open, first valve 428 creates a fluidic pathway through which hot fluid flows from hot fluid conduit 409 to first valve conduit 430. Similarly, when second valve 438 is open, second valve 438 creates a fluidic pathway through which cold fluid flows from cold fluid conduit 411 to second valve conduit 440. As a result, hot fluid from first valve conduit 430 and cold fluid from second valve conduit 440 are conveyed to the coupled faucet.

FIG. 5 shows a fluid control system 502, according to one embodiment of the present arrangements and that is used in a fluid-dispensing system (e.g., fluid-dispensing system 400 of FIG. 4). A hot fluid conduit 509, a first valve conduit 530, a cold fluid conduit 511, a second valve conduit 540, a computer 520, a power supply 522, a first valve subassembly 568, and a second valve subassembly 569, are substantially similar to their counterparts in FIG. 4 (i.e., hot fluid conduit 409, first valve conduit 430, cold fluid conduit 411, a second valve conduit 440, computer 420, power supply 422, first valve subassembly 468, and second valve subassembly 469). Unlike fluid control system 402 of FIG. 4, however, fluid control system 502 also includes a first fluid manifold 572 (which includes hot fluid conduit 509 and first valve conduit 530) and a second fluid manifold 574 (which includes cold fluid conduit 511 and cold fluid pedal conduit 540).

The arrangement of first fluid manifold 572 and second fluid manifold 574 contributes to producing a narrow fluid control system 502. To this end, first fluid manifold 572 and second fluid manifold 574 are linearly arranged adjacent to each other within fluid control system 502 and extend in the same direction. Thus, hot fluid conduit 509, first valve conduit 530, cold fluid conduit 511, and second valve conduit 540 are also linearly arranged and extend in the same direction. First valve subassembly 568, when a portion of first valve 528 is coupled to and disposed within first fluid manifold 572, is linearly arranged with first fluid manifold 572. Second valve subassembly 569, when a portion of second valve 538 is coupled to and disposed within second fluid manifold 574, is also linearly arranged with second fluid manifold 574 and first fluid manifold 572.

The linear configuration of fluid control system 502 allows external conduits to couple to first fluid manifold 572 and second fluid manifold 574 along a linear plane at a single surface of fluid control system 502. During installation of fluid control system 502, external conduits may be quickly and easily connected to fluid control system 502 near the same location, which reduces a need for using external conduits of different lengths.

Figure 6A:
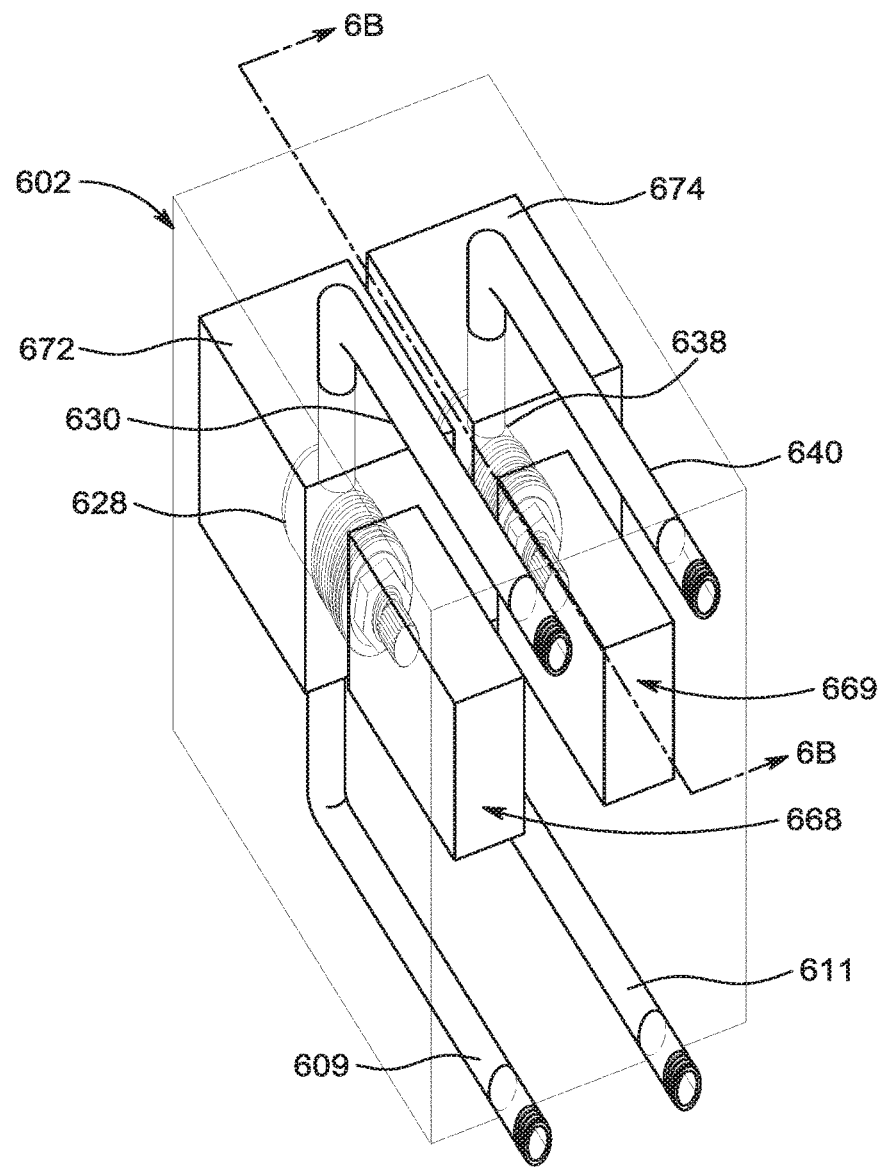
FIG. 6A shows a schematic view of the fluid control system shown in FIG. 4, according to another embodiment of the present arrangements.
Figure 6B:
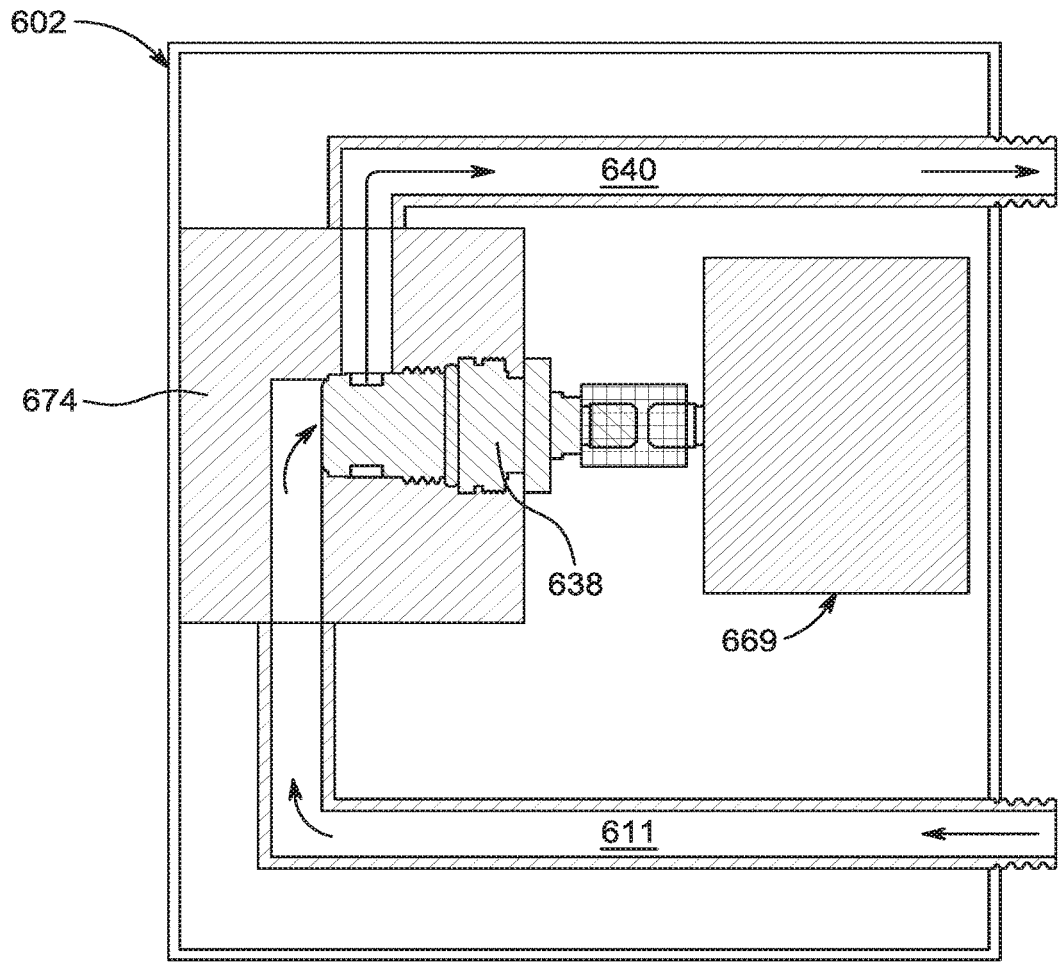
FIG. 6B shows a cross-sectional view of the fluid control system of FIG. 6A.

FIGS. 6A and 6B show a schematic view and a cross-sectional view of a fluid control system 602, respectively, according to another embodiment of the present arrangements and that may be used in a fluid-dispensing system (e.g., fluid-dispensing system 400 of FIG. 4). Similar to fluid control system 502 of FIG. 5, fluid control system 602 includes a first fluid manifold 672 and a second fluid manifold 674. However, unlike in fluid control system 502, first fluid manifold 672 and second fluid manifold 674 couple to external conduits in a compact, nonlinear alignment. First valve conduit 630, of first fluid manifold 672, and second valve conduit 640, of second fluid manifold 674, are linearly arranged adjacent to each other and hot fluid conduit 609 and cold fluid conduit 611 are linearly arranged adjacent to each other. As a result, during installation, external conduits are coupled to first fluid manifold 672 and second fluid manifold 674 on a single surface of fluid control system 602.

The orientation of a first valve 628 and a second valve 638 contribute to a compact fluid control system 602. First valve subassembly 668, when a portion first valve 628 is coupled to and disposed within first fluid manifold 672, extends in the same linear direction as hot fluid conduit 609 and first valve conduit 630 of first fluid manifold 672. Second valve subassembly 669, when a portion second valve 638 is coupled to and disposed within second fluid manifold 674, extends in the same linear direction cold fluid conduit 611 and second valve conduit 640 of second fluid manifold 674. This configuration allows the components of fluid control system 602 to be arranged within a cubical volume, reducing the space needed to install fluid control system 602. By way of example, a space within a kitchen cabinet may be limited due to various components such as a sink, a garbage disposal, a fluid heater, and one or more faucet conduits. Fluid control system 602 contributes to a compact fluid-dispensing system (e.g., fluid-dispensing system 400 of FIG. 4) that may be more easily installed near an associated faucet.

According to one embodiment of the present arrangements, each fluid manifold described above (i.e., fluid manifold 270 of FIG. 2, fluid manifold 370 of FIG. 3, first fluid manifold 572 and second fluid manifold 574 of FIGS. 5, and first fluid manifold 672 second fluid manifold 674 of FIGS. 6A and 6B, respectively) is a combination of components assembled to create the manifold. In a preferred embodiment of the present arrangements, however, each fluid manifold is manufactured as single component. Furthermore, in fluid control systems that include two manifolds (i.e., fluid control systems 402 of FIG. 4, 502 of FIGS. 5, and 602 of FIGS. 6A and 6B), the first fluid manifold and the second fluid manifold may be fabricated or manufactured together as a single component. Each of these single component fluid manifolds, by way of example, may be manufactured using 3D printing or cast (e.g., die cast, sand cast, centrifugal, or investment cast). Advantages of a single component fluid manifold 270 and 370 in a fluid control system (e.g., fluid control system 102 of FIG. 1A) include reduced assembly costs due to fewer components, fewer locations that may leak fluid, and faster and easier installation due to the use of fewer components to be combined and installed.

Figure 7A:
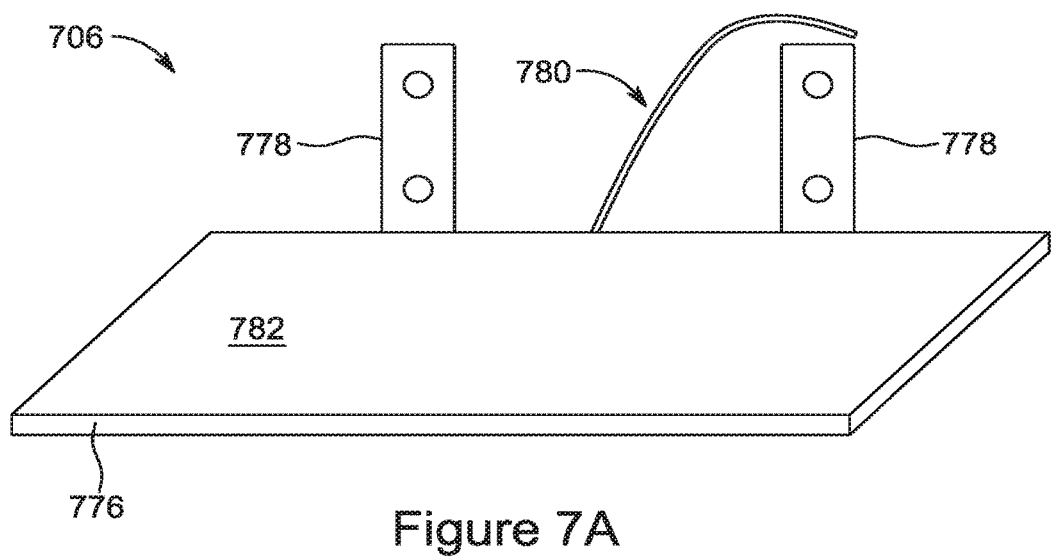
FIG. 7A shows top-perspective view of the flow rate controller of FIGS. 1A and/or 4, according to one embodiment of the present arrangements.
Figure 7B:
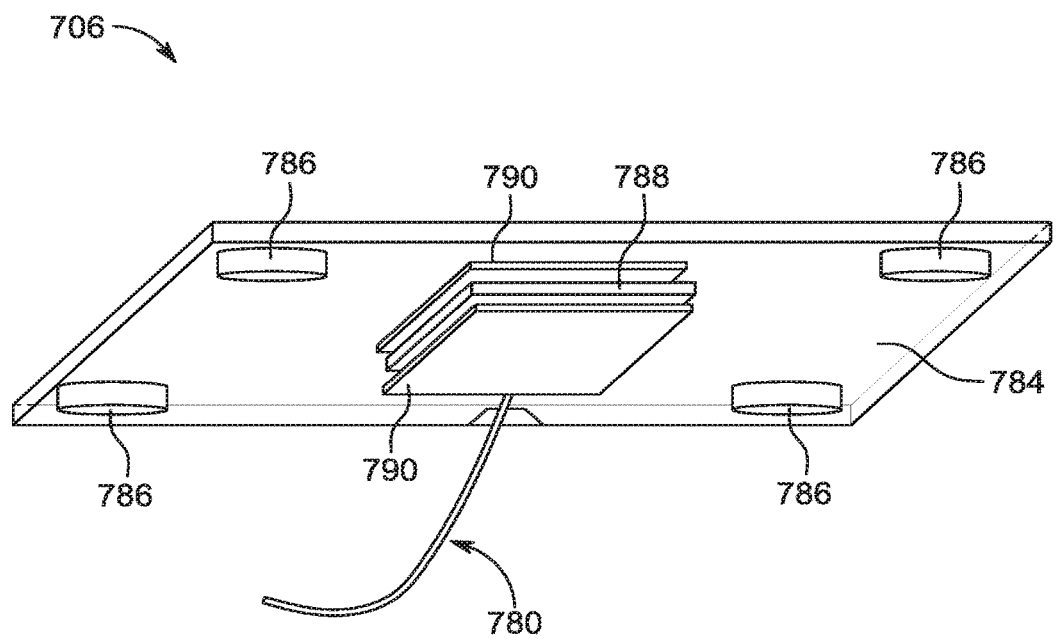
FIG. 7B shows a bottom-perspective view of the flow rate controller of FIG. 7A, according to another embodiment of the present arrangements.

FIGS. 7A and 7B show a top-perspective view and a bottom perspective view, respectively, of a flow rate controller 706, according to one embodiment of the present arrangements. Flow rate controller 706 is substantially similar to flow rate controller 106 of FIGS. 1A-1D and flow rate controller 406 of FIG. 4. Flow rate controller 706 includes a pressure plate 776, and a communication means 780 to transmit information to a fluid control system (e.g., fluid control system 102 of FIG. 1A). In one embodiment of the present arrangements, flow rate controller 706 further includes a pressure plate attachment means 778 to secure pressure plate 776 to a surface. Pressure plate 776 includes a contacting surface 782 designed to receive a force from a user; and a pressure-measuring surface 784 positioned within a recessed region of pressure plate 776 and designed to measure force received by contacting surface 782. Preferably, one or more pressure plate feet 786 are coupled to pressure-measuring surface 784 and extend beyond the recessed portion of pressure plate 776 and contact a rigid surface.

A force-sensing resister 788 is also coupled to pressure-measuring surface 784. Force-sensing resister 788 is coupled to and sandwiched between two or more layers of protective material 790. In one embodiment of the present arrangements, force-sensing resistor 788 measures a deflection distance of pressure plate 776 caused by a force applied to contacting surface 782. By way of example, force-sensing resister 788 may detect a deflection distance that is between about 0.005 inches and about 0.01 inches. In another embodiment of the present arrangements, a force applied to force-sensing resister 788 causes conducting electrodes within force-sensing resister 788 to touch, which reduces the resistance of force-sensing resister 788. In other words, an increase in force on contacting surface 782 reduces the resistance of force-sensing resister 788. The resistance information or deflection information is transmitted from flow rate controller 706 to the fluid control system. In one embodiment of the present arrangements, force-sensing resister 788 is about 1.56 inches wide, about 1.56 inches long, and about 0.2 inches thick.

In another embodiment of the present arrangements, force-sensing resistor 788 and protective material 790 extend beyond the recessed portion of pressure plate 776 and contact the rigid surface. Force-sensing resistor 788 and protective material 790 may extend the same distance as pressure plate feet 786 or beyond. During operation of flow rate controller 706, when a user applies a force to contacting surface 782, the rigid surface applies a pressure to force-sensing resistor 788, which generates a change in resistance that can be transmitted to the fluid control system.

Figure 8A:
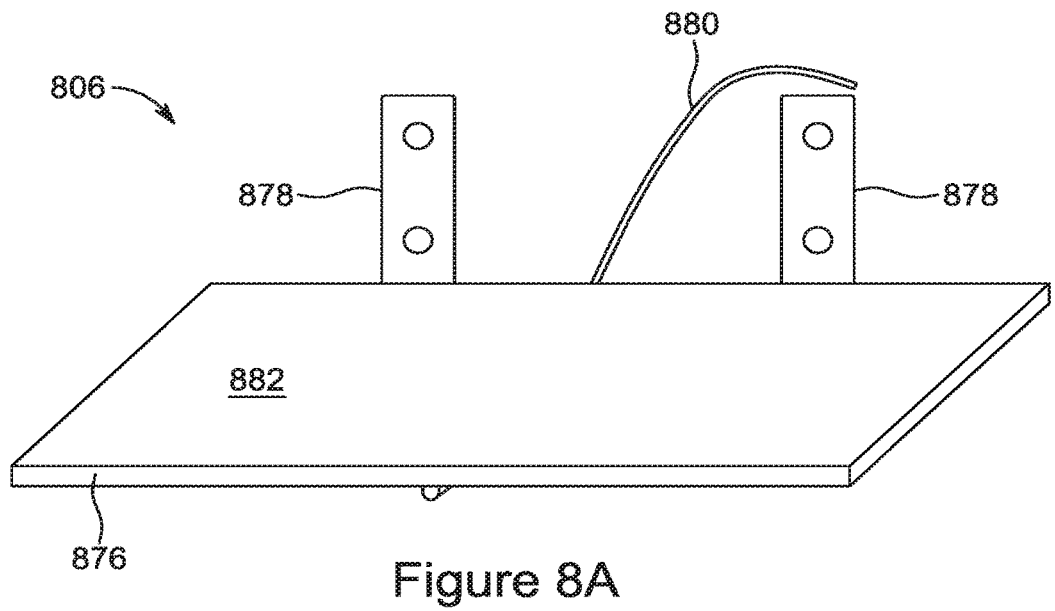
FIG. 8A shows top-perspective view of the flow rate controller of FIGS. 1A and/or 4, according to another embodiment of the present arrangements.
Figure 8B:
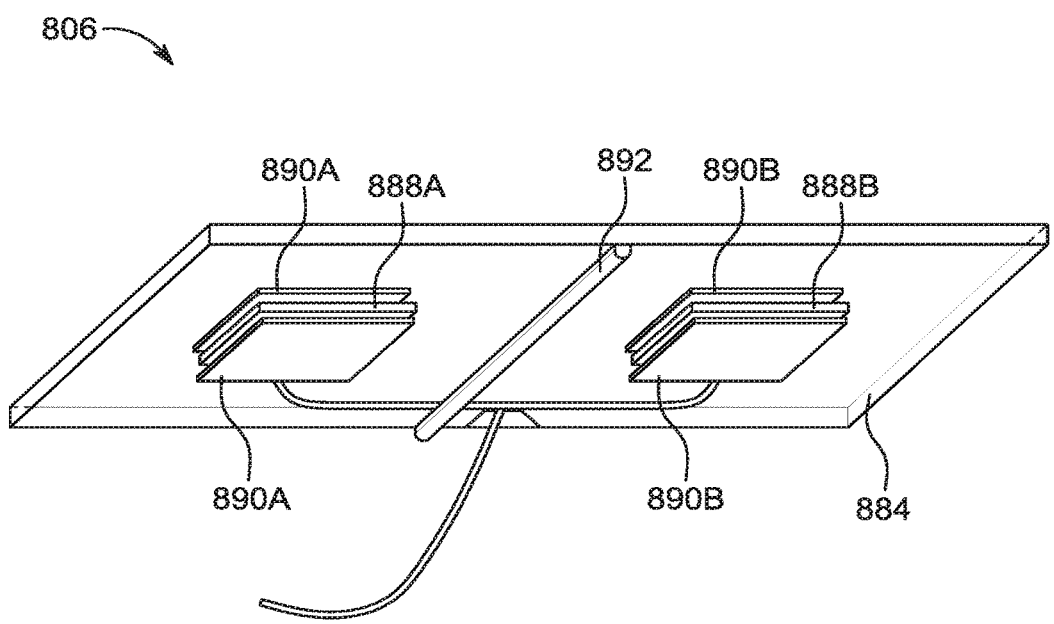
FIG. 8B shows a bottom-perspective view of the flow rate controller of FIG. 8A.

FIGS. 8A and 8B show a top-perspective view and bottom-perspective view, respectively, of a flow rate controller 806, according to another embodiment of the present arrangements. Flow rate controller 806 is substantially similar to flow rate controller 106 of FIGS. 1A-1D and flow rate controller 406 of FIG. 4. Flow rate controller 806 includes a pressure plate 876, a contacting surface 882, a pressure-measuring surface 884, an optional pressure plate attachment means 878, and a communication means 880, which are substantially similar to their counterparts in FIGS. 7A and 7B (i.e., pressure plate 776, contacting surface 782, pressure measuring surface 784, optional pressure plate attachment means 778, and communication means 780). Flow rate controller 806, however, also includes a pivot arm 892 coupled to pressure-measuring surface 884. Pivot arm 892, when in contact with a rigid surface (e.g., a floor), allows flow rate controller 806 to axially pivot along the length of pivot arm 892.

Flow rate controller 806 also includes two force-sensing resistors 888A and 888B, each coupled to and sandwiched between two or more layers of protective material 890A and 890B, respectively. Force-sensing resistors 888A and 888B are positioned on opposing sides of a pivot arm 892. During an operative state of fluid-dispensing system 100 of FIG. 1A or fluid-dispensing system 400 of FIG. 4, force-sensing resistors 888A and 888B work in tandem to generate information that is used to determine fluid flow rate. Additionally, force-sensing resistors 888A and 888B may control temperature by measuring pressure caused by a force on the right portion and/or left portion of pressure plate 876. In other words, force-sensing resistors 888A measures a force on the left side of pressure plate 876 and force-sensing resistors 888B measures a force on the right side of pressure plate 876. During an operative state of fluid-dispensing system 100 of FIG. 1A or fluid-dispensing system 400 of FIG. 4, when a force applied to the left portion of pressure plate 876 is greater than a force applied to the right portion of pressure plate 876, hot fluid is dispersed from a faucet (e.g., faucet 104 of FIG. 1A) and when the force applied to the right portion of pressure plate 876 is greater than the pressure applied to the left portion of pressure plate 876, cold fluid is dispensed from a faucet. The degree of hot or cold fluid dispensed by a faucet is dependent upon the difference in pressure magnitude between the left and right portion of pressure plate 876. In other words, a greater pressure force on the left portion of pressure plate 876 corresponds to hotter fluid being dispensed from the faucet and a greater force on the right portion of pressure plate 876 corresponds to colder fluid being dispensed from the faucet. The pressure measured by 888A and 888B are used by a computer, in combination, to determine a fluid flow rate.

Figure 9A:
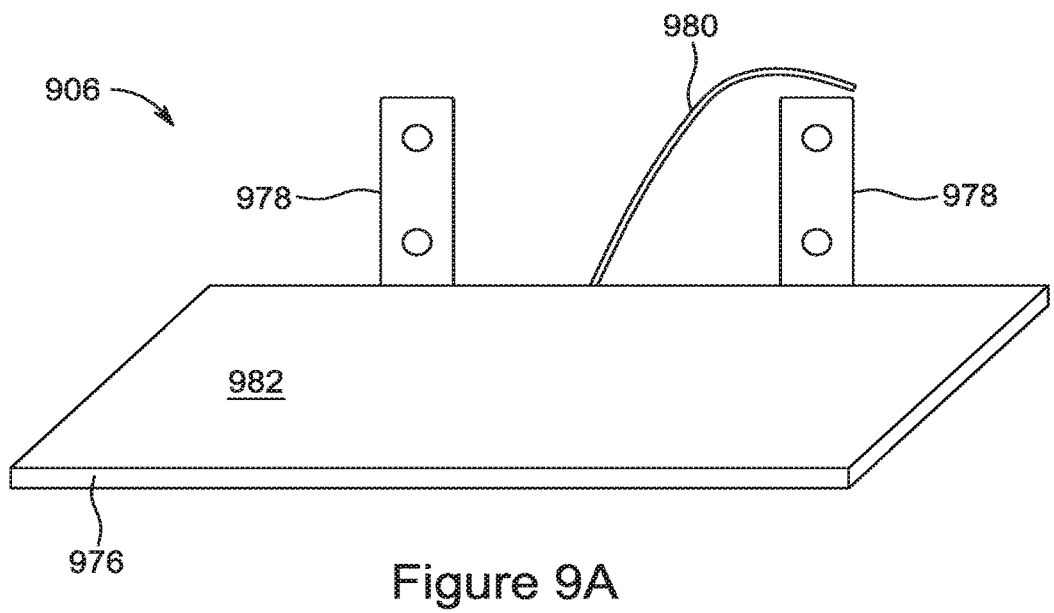
FIG. 9A shows top-perspective view the flow rate controller of FIGS. 1A and/or 4, according to yet another embodiment of the present arrangements.
Figure 9B:
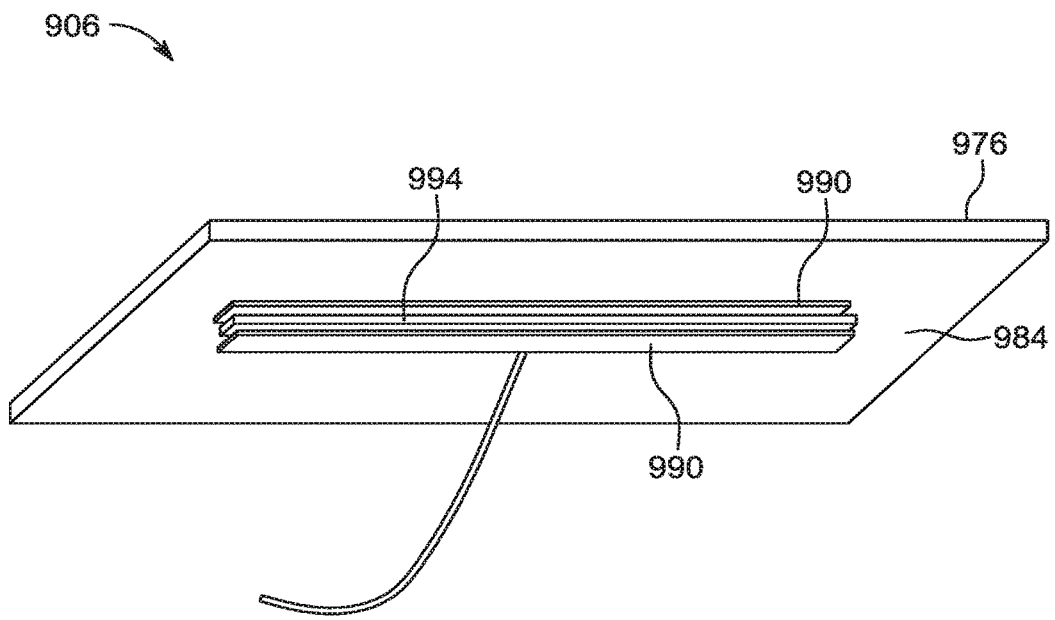
FIG. 9B shows a bottom-perspective view of the flow rate controller of FIG. 9A.

FIGS. 9A and 9B show a top-perspective view and bottom-perspective view, respectively, of a flow rate controller 906, according to yet another embodiment of the present arrangements. Flow rate controller 906 is substantially similar to flow rate controller 106 of FIGS. 1A-1D and flow rate controller 406 of FIG. 4. Flow rate controller 906 includes a pressure plate 976, a pressure plate attachment means 978, a communication means 980, a contacting surface 982, and a pressure-measuring surface 984 that are substantially similar to their counterparts in FIGS. 7A and 7B (i.e., pressure plate 776, optional pressure plate attachment means 778, communication means 780, contacting surface 782, and pressure-measuring surface 784). Flow rate controller 906, however, includes a force-sensing linear potentiometer 994 coupled to and sandwiched by protective material 990. Force-sensing linear potentiometer 994 detects a magnitude of force and the location of the force along potentiometer 994. During an operative state a fluid-dispensing system of the present arrangements, flow rate controller 906 provides information to fluid control system (e.g., fluid control system 102 of FIG. 1A) to dispense fluid at a particular flow rate and temperature, depending of the force applied to pressure plate 976 and the location of the force along the length of force-sensing linear potentiometer 994. Fluid dispensed from a faucet has a hotter temperature as pressure is applied farther to the left of pressure plate 976, and the fluid has a cooler temperature as pressure is applied farther to the right on pressure plate 976. Fluid flow rate is determined by a force of pressure against pressure-measuring surface 985 at any location.

Figure 10:
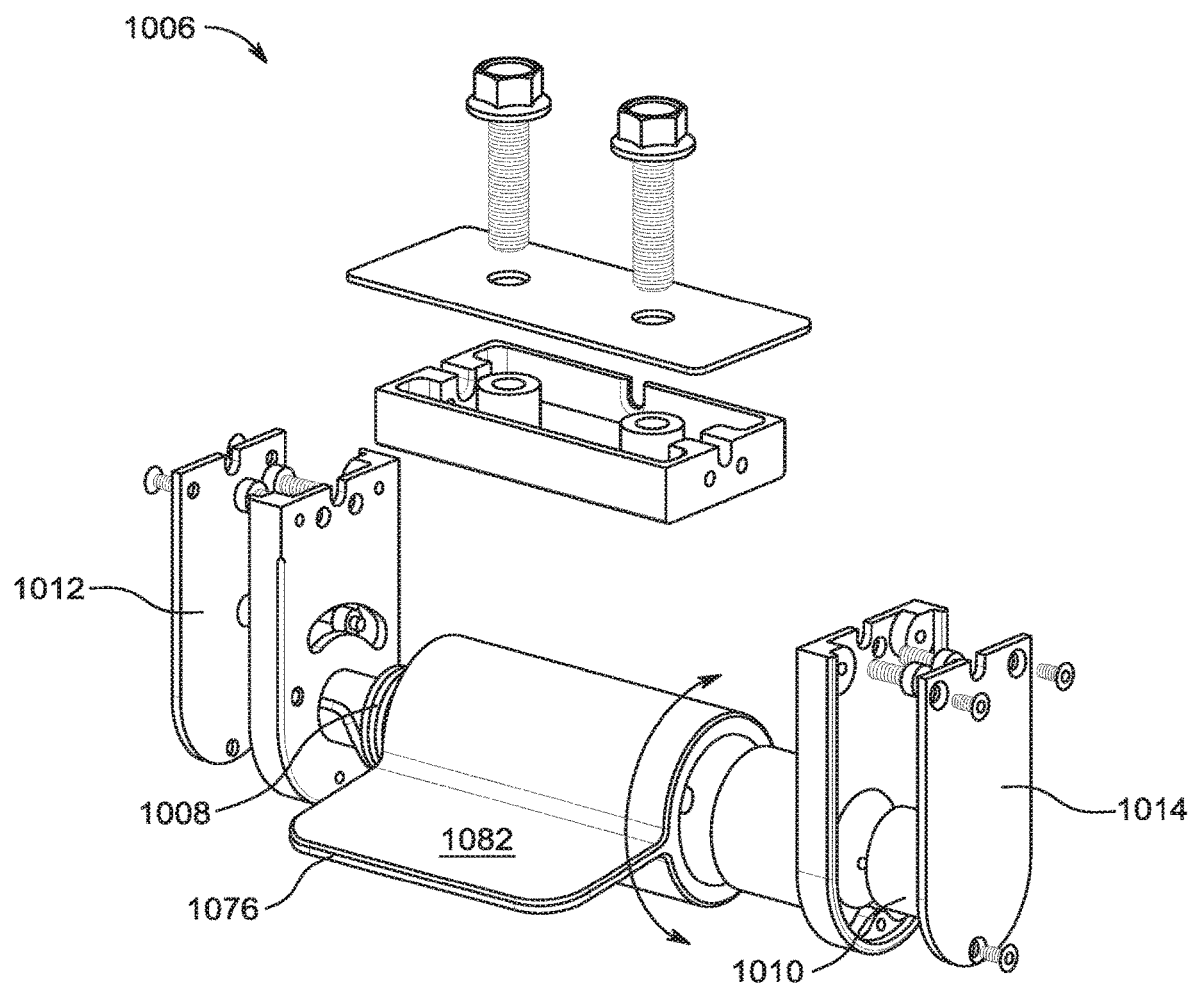
FIG. 10 shows an exploded view of the flow rate controller of FIGS. 1A and/or 4, according to yet another embodiment of the present arrangements.

FIG. 10 shows a flow rate controller 1006, according to yet another embodiment of the present arrangements and that is substantially similar to flow rate controller 106 of FIGS. 1A-1D and flow rate controller 406 of FIG. 4. Flow rate controller 1006 includes a force-receiving feature 1076 that is rotatably coupled, on one end, to a first flow rate controller arm 1012 and, on another end, to a second flow rate controller arm 1014. In an assembled configuration, force-receiving feature 1076 rotates around an axis that runs through force-receiving feature 1076 and that is perpendicular to flow rate controller arms 1012 and 1014.

A flow rate controller spring 1008, coupled to first flow rate controller arm 1012 and force-receiving feature 1076, holds force-receiving feature 1076 in a non-engaged position (i.e., when force-receiving feature 1076 is not engaged by a user). During an operative state of flow rate controller 1006, a force applied to contacting surface 1082, causes force-receiving feature 1076 to rotate along its axis. Flow rate controller spring 1008 provides resistance to the user's force, such that when the user removes the force from contacting surface 1082, force-receiving feature 1076 returns to the non-engaged position. A flow rate encoder 1010, housed within second flow rate controller arm 1014 and communicatively coupled to force-receiving feature 1076, measures angular displacement of force-receiving feature 1076 caused by a magnitude of force on force-receiving feature 1076. As discussed above, a fluid-dispensing system (e.g., fluid-dispensing system 100 of FIG. 1A) uses angular displacement, measured by flow rate encoder 1010, to adjust fluid flow rates through a first valve and a second valve.

In another embodiment of the present arrangements, flow rate controller 1006, in addition to adjusting fluid flow rate, adjusts temperature of the fluid flow dispensed from a faucet. By way of example, a temperature encoder, one or more force sensing resistors (e.g., force sensing resistors 888A and 888B), or a force sensing linear potentiometer (e.g., force sensing linear potentiometer 994), as described above, may be coupled to force-receiving feature 1076. A user, using flow rate controller 1106, may adjust the temperature of fluid flow by adjusting a location where force (i.e., a left and right portion) is applied to force-receiving feature 1076 and the magnitude of force applied to force-receiving feature 1076. In a preferred embodiment of the present arrangements, a force applied to the left portion of force-receiving feature 1076 reduces the fluid flow temperature and a pressure applied to the right portion of force-receiving feature 1076 increases the fluid flow temperature.

A water dispensing system having flow rate controller configured to adjust fluid flow rate and fluid temperature, may include additional features to turn on or turn off that ability of flow rate controller to adjust fluid temperature. This may be thought of as a safety feature to prevent the user or another entity from accidently adjusting the temperature using the flow rate controller. By way of example, if the temperature controller adjusted to be within into a pre-defined position or range of positions, the flow rate controller may be used to control fluid temperature. However, if the temperature controller is not in this predefined position or range of positions, the temperature controller will override the temperature control function of flow rate controller. In this operative state, the flow rate controller will control flow rate of the fluid but not fluid temperature.

According to one embodiment of the present teachings, the magnitude of force exerted on the flow rate controller by a user may correspond to a water stream flow rate that exceeds the combination of the hot and cold water flow rates received by the water-dispensing system. The present teachings provide methods of limiting the water stream flow rate to a flow rate the water-dispensing system is capable of producing. In one embodiment of the present teachings, if the magnitude of force received by the flow rate controller exceeds a certain threshold force, the flow rate controller flow rate encoder generates a substantially maximum flow rate signal, rather than produce the flow rate that is commensurate with the magnitude of the force. In other words, flow rate controller flow rate encoder will not transmit a flow rate signal that exceeds the certain threshold. Instead, the flow rate encoder will transmit the flow rate signal commensurate with the certain threshold force. Thus, the flow rate of the water stream that corresponds to a force above the predetermined threshold is substantially similar to the flow rate of the water stream obtained by receiving the threshold force.

In another embodiment of the present teachings, the flow rate controller flow rate encoder transmits the flow rate signal, regardless of the corresponding magnitude of force on the flow rate controller. The computer receives, from the flow rate controller encoder, the flow rate signal, and if the flow rate signal exceeds a maximum flow rate signal, the computer will use the maximum flow rate signal for computing the above-mentioned first amount of power for the first motor and second amount of power for the second motor. Thus, the flow rate of the water stream that corresponds to a force above the maximum flow rate signal is substantially similar to the flow rate of the water stream of corresponding to the maximum flow rate signal.

Figure 11:
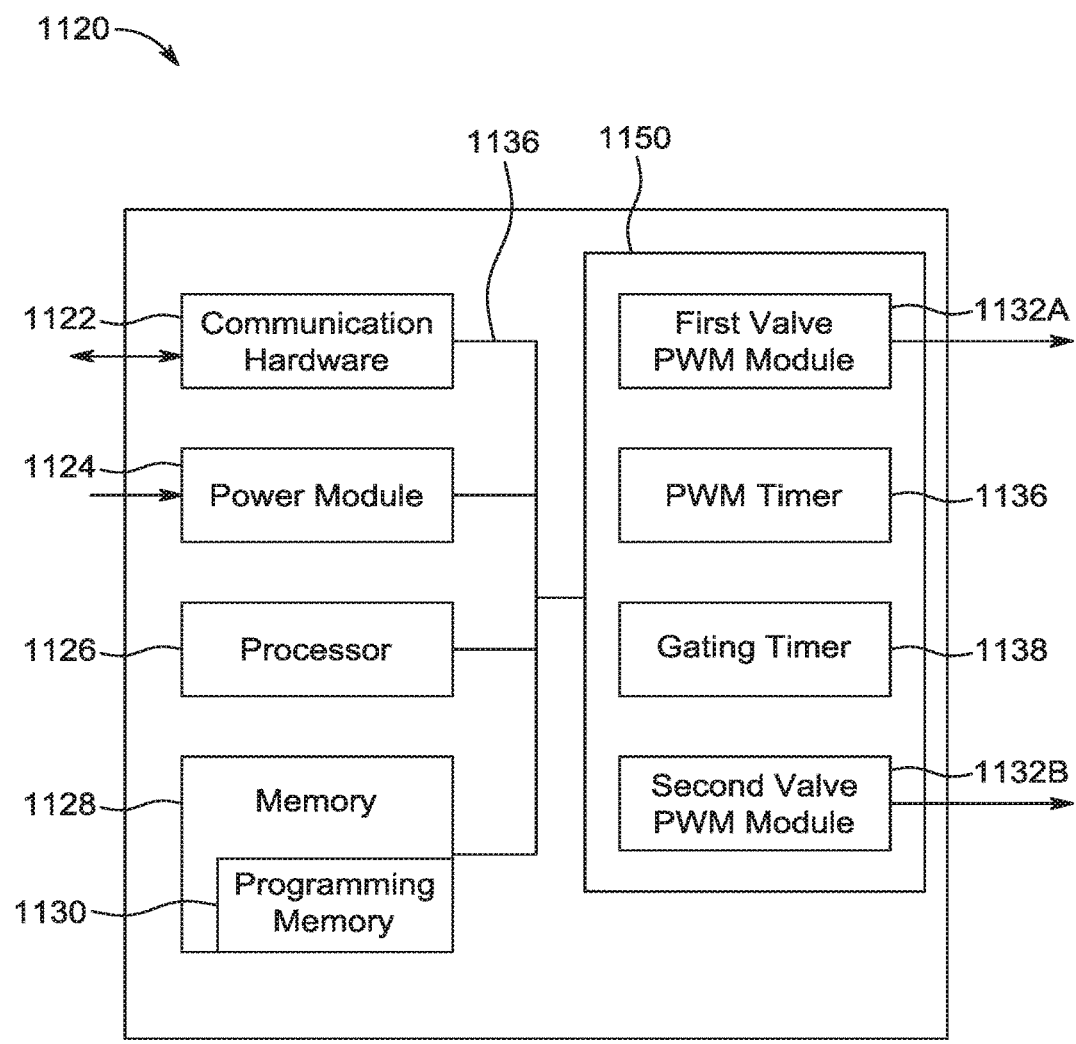
FIG. 11 shows a simplified block diagram of a computer, according to one embodiment of the present arrangements, within the fluid control system of FIG. 1B and that includes a PWM module subsystem.

FIG. 11 shows internal construction blocks of a computer 1120, according to one embodiment of the present arrangements and aspects of the present teachings may be implemented and executed therein. Computer 1120 is substantially similar to computer 120 of FIG. 1B. Computer 1120 includes a databus 1136 that allows for communication between each computer module and/or subsystem, such as communication module 1122, a power module 1124, a processor 1126, a digital memory 1128, and a PWM module subsystem 1150.

Processor 1126 calculates a first valve pulse width modulation ("PWM") value and a second valve PWM value and provides these values to PWM module subsystem 1150. The first valve PWM value and the second valve PWM value are calculated based on a temperature setting and a mechanical disturbance to produce an output fluid stream having a desired flow rate at a desired temperature.

Memory 1128, in one embodiment of the present arrangements, includes unique programming algorithms and/or lookup tables that enable processor 1226 to compute information regarding an amount of power or signal information that will be sent to a first motor (e.g., first motor 124 of FIG. 1B) and/or second a motor (e.g., second motor 134 of FIG. 1B). In another embodiment of the present arrangements, memory 1128 receives and stores desired temperature and flow rate information (e.g., temperature count value and flow rate count value) based on the temperature setting and the mechanical disturbance, respectively.

In another embodiment of the present arrangements, memory 1138 includes programming memory 1130 that has stored therein programming that instructs processor 1126 to receive information and/or transmit information. By way of example, processor 1126 receives information, via communication hardware 1122, from a leak detection sensor (e.g., leak detection sensor 158 of FIG. 1B), a flow rate controller (e.g., flow rate controller 106 of FIG. 1A), and/or a remote temperature control mechanism (e.g., remote temperature control mechanism 116 of FIG. 1A).

Power module 1124, receives power from a power source (e.g., electric plug 118 of Figure or battery system 160 of FIG. 1B) and distributes power to each computer module, as required. In one embodiment of the present arrangements, power, from power module 1124, is transmitted to a first motor to control fluid flow from a first valve and/or to a second motor to control fluid flow from a second valve.

In one embodiment of the present arrangements, PWM module subsystem 1150 includes a first valve caption/compare/pulse width modulation module (hereinafter referred to as a "PWM module") 1132A, a second valve PWM module 1132B, a PWM timer 1136, and a gating timer 1138. First valve PWM module 1132A generates a first valve PWM control signal that is based on the first valve PWM value. Second valve PWM module 1132B generates a second valve PWM control signal that is based on the second valve PWM value.

The PWM timer 1236, operating in conjunction with each of the first PWM module 1132A and the second PWM module 1132B, generates a first valve PWM waveform and a second PWM waveform, respectively. Gating timer 1138, operating in conjunction with each of the first PWM module 1132A and said second PWM module 1132B, interrupts output of each of the valve PWM waveform and the second PWM waveform to produce the first valve PWM control signal and the second valve PWM control signal, respectively.

In one aspect of the present arrangements, the first valve PWM control signal is received by the first motor, which controls fluid flow from a first valve. Similarly, the second valve PWM control signal received by the second motor, which controls fluid flow from a second valve.

Figure 12:
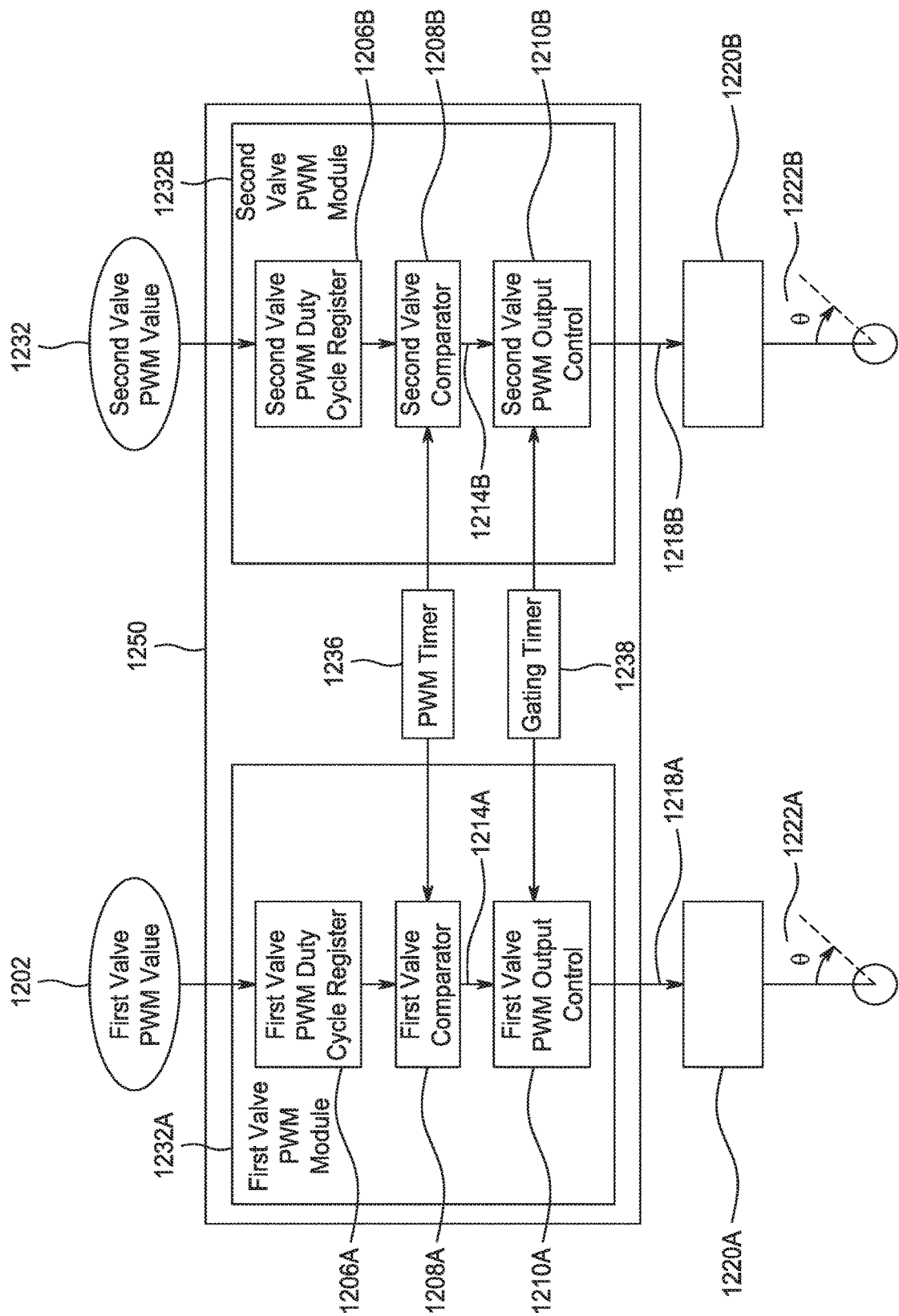
FIG. 12 shows a simplified block diagram of a PWM module subsystem, according to one embodiment of the present arrangements, within the computer of FIG. 11.

FIG. 12 shows a PWM module subsystem 1250, according to one embodiment of the present arrangements. PWM module subsystem 1250 includes a first valve PWM module 1232A, a second valve PWM module 1232B, a PWM timer 1236 and a gating timer 1238, which are substantially similar to their counterparts in FIG. 11 (i.e., first valve PWM module 1132A, second valve PWM module 1132B, PWM timer 1136, and gating timer 1138 of FIG. 11.) First valve PWM module 1232A includes a first valve PWM duty cycle register 1206A, a first valve comparator 1208A, and a first valve PWM output control 1210A. Similarly, second valve PWM module 1232B includes a second valve PWM duty cycle register 1206B, a second valve comparator 1208A, and a second valve PWM output control 1210B. In FIG. 12, first valve PWM module 1232A, second valve PWM module 1232B, PWM timer 1236, and gating timer 1238 are disposed with PWM module subsystem, however, present teachings also recognize that these components may be situated in any location with a computer and/or component that is coupled to the computer.

First valve PWM duty cycle register 1206A and second valve PWM duty cycle register 1206B receives first valve PWM value 1202 and second valve PWM value 1232, respectively. PWM timer 1236, communicatively coupled to and provides a time counting function to first valve comparator 1208A and second valve comparator 1208B. During an operative state of PWM module subsystem 1250, first valve comparator 1208A receives first valve PWM value 1202 and generates a first valve PWM waveform 1214A and second valve comparator 1208B receives second valve PWM value 1232 and generates a second valve PWM waveform 1214B.

Gating timer 1238 is communicatively coupled to and facilitates a filtering function at first valve PWM outlet control 1210A and second valve PWM outlet control 1210B. During an operative state of PWM module subsystem 1250, first valve PWM outlet control 1210A receives first valve PWM waveform 1214A and generates a filtered first valve control signal 1218A. Second valve PWM outlet control 1210B receives second valve PWM waveform 1214B and generates a filtered second valve control signal 1218B.

A first motor 1220A, which is communicatively coupled to first valve PWM module 1232A, receives and implements filtered first valve control signal 1218A to cause a first valve stem displacement 1222A. A second motor 1220B, which is communicatively coupled to second valve PWM module 1232B, receives and implements filtered second valve control signal 1218B to cause a second valve stem displacement 1222B. Displacement of the first valve stem and/or the second valve stem may be a linear displacement or a rotational or angular displacement.

Figure 13:
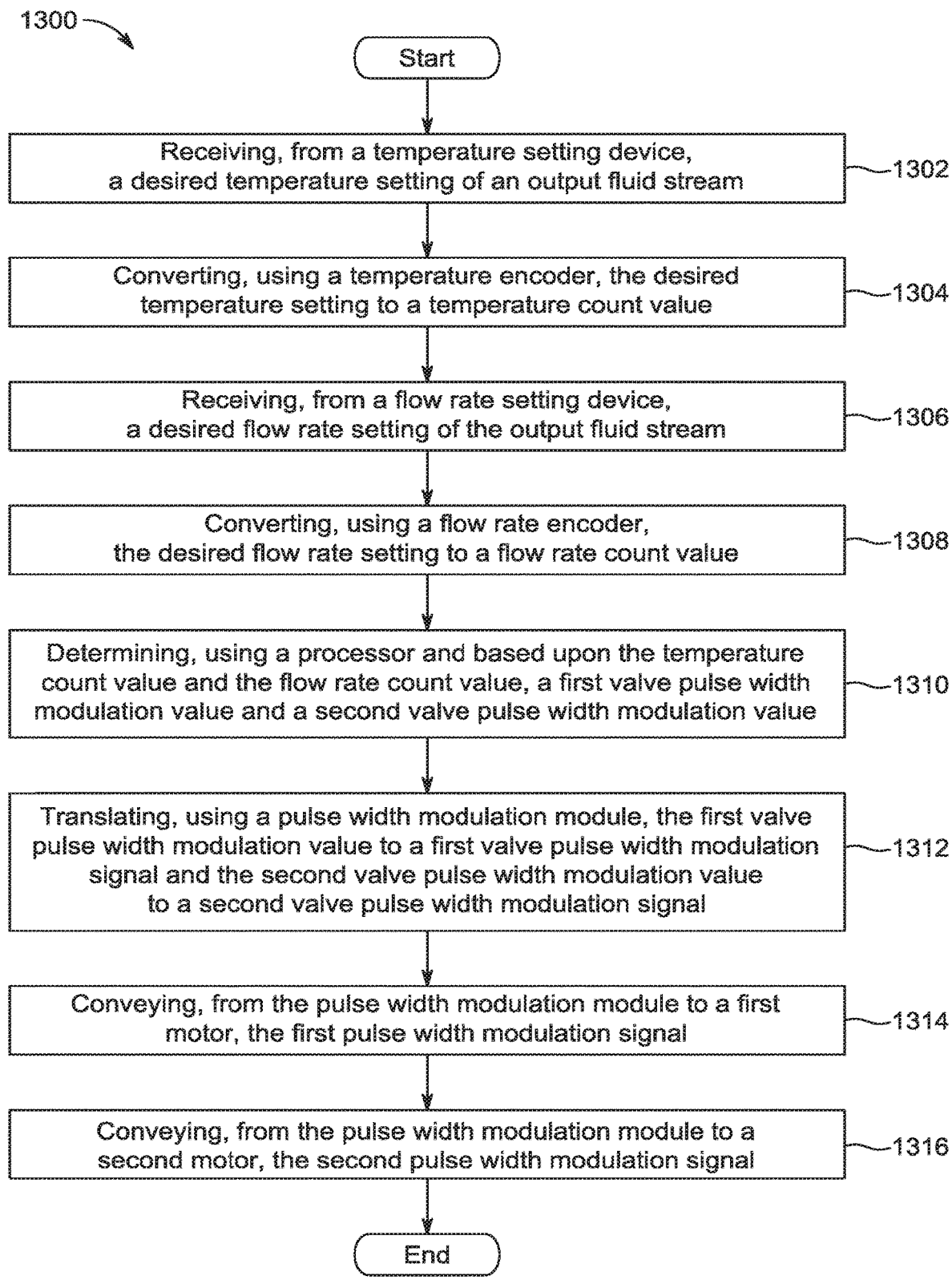
FIG. 13 shows a process flow diagram for a method, according to one embodiment of the present teachings, of dispensing an output fluid stream bases on a desired temperature setting and a desired flow rate setting of the output fluid stream.

The present teachings also offer, among other things, methods of dispensing fluid. FIG. 13 shows a method of dispensing fluid 1300, according to one embodiment of the present teachings. Method 1300 begins with a step 1302, which includes receiving, from a temperature setting device, a desired temperature setting of an output fluid stream. By way of example, a user applies a temperature-setting force to a temperature controller (e.g., temperature controller 116 of FIG. 1A) to a position that is commensurate with the user's desired temperature for the output fluid stream. The temperature-setting force, in one embodiment of the present teachings, causes a rotational or angular displacement of a least a portion of the temperature setting device (e.g., a handle or knob).

Next, a step 1304 includes converting, using a temperature encoder, the desired temperature setting to a temperature count value. The temperature encoder, in one embodiment of the present teachings, is disposed within or coupled to a temperature controller. The temperature encoder receives and/or identifies a displacement (e.g., a rotational, an angular, or a linear displacement) of a least a portion of the temperature setting device and converts that displacement into a temperature count value. In one embodiment of the present teachings, the temperature encoder converts a rotational or angular displacement to a temperature count value by multiplying the rotational or angular displacement and a ratio of a total count value and 360 degrees. The total count value is equivalent to a measured or realized count value when the rotational or angular displacement is 360 degrees. In a preferred embodiment of the present arrangements, using a 12 bit encoder, the total count value of the temperature encoder is 4,095, where zero is included in the total count value.

Next, or contemporaneously with step 1302, a step 1306 is carried out. Step 1306 includes receiving, from a flow rate setting device, a desired flow rate setting of the output fluid stream. By way of example, a user applies a force to a force-receiving feature (e.g., force-receiving feature 1076 of FIG. 10) of a flow rate controller (e.g., flow rate controller 1006 of FIG. 10) that is commensurate with the user's desired flow rate for the output fluid stream.

Step 1306 is followed by a step 1308. This step 1308 includes converting, using a flow rate encoder (e.g., flow rate encoder 1010 of FIG. 10), the desired flow rate setting to a flow rate count value. The flow rate encoder, in one embodiment of the present teachings, is disposed within or coupled to a temperature controller. The flow rate encoder receives and/or identifies a displacement (e.g., a rotational, an angular, or a linear displacement) of the force-receiving feature and converts that displacement into a flow rate count value. In one embodiment of the present teachings, the flow rate encoder converts the rotational or angular displacement to a temperature count value by multiplying the rotational or angular displacement and a ratio of a total count value and 360 degrees. In a preferred embodiment of the present arrangements, the total count value of the flow rate encoder is the same as the temperature encoder.

A step 1310 includes computing, using the temperature count value and the flow rate count value, a first valve PWM value and a second valve PWM value. In one embodiment of the present teachings, step 1310 performed is by computing, using a processor and based on a temperature count value and a flow rate count value, the first valve PWM value and the second valve PWM value. Example 1 and Example 2, discussed below, provides an exemplar process for computing the first valve PWM value and the second valve PWM value. Example 1 provides an exemplar process of generating, using the temperature count value and the flow rate count value, a temperature step value and a flow rate step value. Example 2, provides an exemplar process for computing, using the temperature step value and the flow rate step value, the first valve PWM value and the second valve PWM value.

In yet another embodiment of the present teachings, step 1310 includes determining, using a count-PWM look-up table, the first valve PWM and the second valve PWM value. The count-PWM look-up table provides a correlation between the temperature count value, the flow rate count value, the first valve PWM and the second valve PWM value. For a selected temperature count value and a selected flow rate count value, the look-up table provides a resulting first valve PWM value and a resulting second valve PWM value.

By way of example, if the temperature encoder and the flow rate encoder are 6-bit encoders, each have a total count value 63, which has an [63×63] array of discrete valve positions is created. As a result, there were 3,969 (i.e., 63×63=3,969) discrete valve positions that adjust water temperature and water flow rate of the output fluid stream. By way of another example, if the temperature encoder and the flow rate encoder are 12-bit encoders, each have a total count value 4,065, which has an [4,065×4,065] array of discrete valve positions is created. As a result, there were 16,769,025 (i.e., 63×63=16,769,025,) discrete valve positions that adjust water temperature and water flow rate of the output fluid stream. Use of a count-PWM look-up table may be implemented in applications that use encoders with small total count values (e.g., 6-bit encoder) or where minute adjustments to the fluid flow rates through the first valve and/or the second valve are advantageous (e.g., 12-bit encoder). Preferably, computer has memory storage that is large enough to store the count-PWM look-up table and a processor that is capable indexing a particular temperature count value and flow rate count value.

In a preferred embodiment of the present teachings, step 1310 includes generating, using the temperature count value and the flow rate count value, a temperature step value and a flow rate step value. Discussed in greater detail in Example 1, a step value includes a group of consecutive numbers and each number within the group is assigned the same step value. Next, the processor, using a step-PWM look-up table, determines the first valve PWM value and the second valve PWM value. The step-PWM value look-up table provides a correlation between the temperature step value, the flow rate step value, the first valve PWM and the second valve PWM value.

By way of example, if a total step value for temperature is 30 and a total step value for flow rate is 110, an [30×110] array of discrete valve positions is created. As a result, there were 3,300 (i.e., 30×110=3,300) discrete valve positions that adjust water temperature and water flow rate of the output fluid stream. This embodiment is preferable in implantations where power, processing capabilities, and memory are limited. By way of example, an 8-bit microcontroller is capable of calculating, using the temperature count value and the flow rate count value, temperature step value the flow rate step value and the flow rate step value, and identify, using a step-PWM look-up table, a corresponding first valve PWM value and second valve PWM value.

Figure 15:
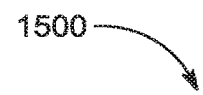
FIG. 15 shows a look-up table, according to one embodiment of the present teachings, that provides a correlation between a flow rate step value, a temperature step value, a first valve PWM value and a second valve PWM value.

FIG. 15 shows a portion of an exemplar step-PWM look-up table 1500. For a selected flow rate step value 1502 and a selected temperature step value 1504, the look-up table provides a resulting first valve PWM value 1506 and a resulting second valve PWM value 1508. In a preferred embodiment of the present teachings, the PWM value look-up table is stored in computer memory (e.g., memory 1128 of FIG. 11).

Returning to method 1300, a step 1312 includes translating the first valve PWM value to a first PWM signal and the second valve PWM value to a second PWM signal. In one embodiment of the present arrangements, PWM modules translate the first valve PWM value to the first PWM signal and the second valve PWM value to the second PWM signal. By way of example, first valve PWM module (e.g., first valve PWM module 1232A of FIG. 12) receives, from the processor, the first valve PWM value. In conjunction with a PWM timer and the gating timer, the first valve PWM module translates the first valve PWM value to the first PWM signal. Similarly, a second valve PWM module (e.g., second valve PWM module 1232B of FIG. 12) receives, from the processor, the second valve PWM value. In conjunction with the PWM timer and the gating timer, the second valve PWM module translates the second valve PWM value to the second PWM value. Steps 1406, 1408, and 1410 of FIG. 14, described below, provide a method, according to one embodiment of the present teachings, of translating the first valve PWM value to a first PWM signal and translating the second valve PWM value to a second PWM signal.

Then method 1300 proceeds to a step 1314. Step 1314 includes conveying, from the processor or the first valve PWM module to a first motor (e.g., first motor 124 of FIG. 1B), the first PWM signal.

Next, or contemporaneously with step 1314, a step 1316 is carried out. Step 1316 includes conveying, from the processor or the second valve PWM module to a second motor (e.g., second motor 134 of FIG. 1B), the second PWM signal. The present teachings recognized that the first and second PWM signal, respectively, may be transmitted by a wired and/or a wireless connection.

During an operative state of the present teachings, the first PWM signal activates the first motor, which is coupled to a first valve shaft (e.g., first valve stem 126 of FIG. 1B). The activated first motor, in one embodiment of the present teachings, rotates the first valve shaft causing a first valve (e.g., first valve 128 of FIG. 1B) to open. The open first valve produces a first fluid flow at a first fluid flow rate. The second PWM signal activates the second motor, which is coupled to a second valve shaft (e.g., first valve stem 136 of FIG. 1B). The activated second motor, in one embodiment of the present teachings, rotates the second valve shaft causing a second valve (e.g., second valve 138 of FIG. 1B) to open. The open second valve produces a first fluid flow at a first fluid flow rate.

It is noteworthy that the desired temperature, which is commensurate with the position of the temperature controller set by the user, is produced by a combination or mixing of the first fluid flow and the second fluid flow. Similarly, the desired flow rate of the admixed fluid stream, which is commensurate with magnitude of force the user exerts on the force-receiving feature the flow rate controller, is the sum of the first fluid flow rate and the second fluid flow rate. Thus, present teachings provide for hands-free control of fluid flow at a desired flow rate and at a desired temperature.

Figure 14:
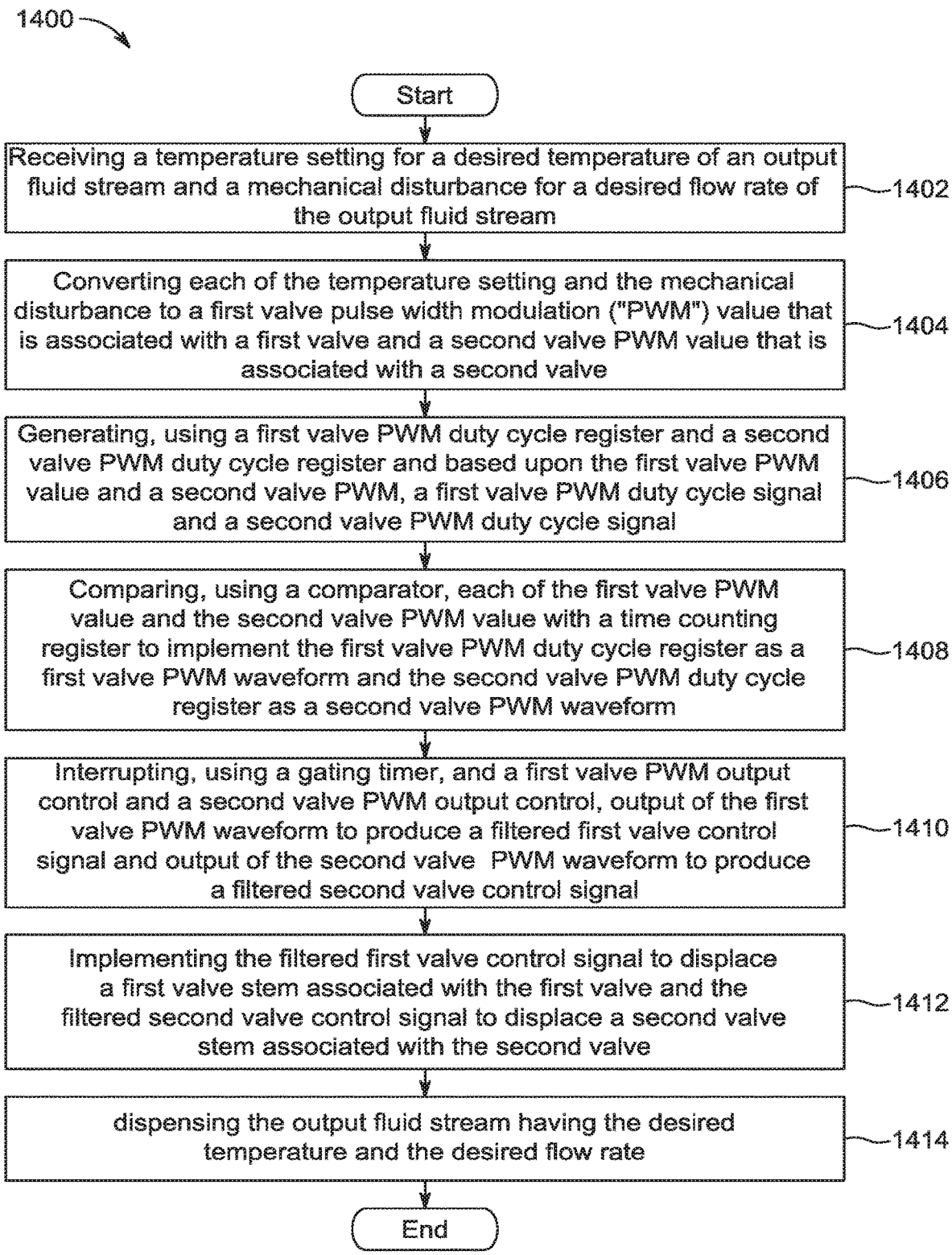
FIG. 14 shows a process flow diagram of method, according to another embodiment of the present teachings, of dispensing an output fluid stream bases on a desired temperature setting and a desired flow rate setting of the output fluid stream.

FIG. 14 shows a method of dispensing fluid 1400, according to another embodiment of the present teachings. Method 1400 may begin with a step 1402, which includes receiving a temperature setting for a desired temperature of the output fluid stream and a mechanical disturbance for a desired flow rate of the output fluid stream. Step 1402 is substantially similar to the combined steps 1302 and 1306 of FIG. 13. A user applies a temperature-setting force to a temperature controller to a position that is commensurate with the user's desired temperature for the output fluid stream and a flow rate-setting force to a force-receiving feature that is commensurate with the user's desired flow rate for the output fluid stream.

Next a step 1404 includes converting each of the temperature setting to a first valve PWM value that is associated with a first valve and converting the mechanical disturbance to a second value PWM value that is associated with a second valve. The first valve allows flow of a first input fluid stream having a first temperature. The second valve allows flow of a second input fluid stream having a second temperature, which is different from the first temperature. In a preferred embodiment of the present teachings, the desired temperature of the output fluid stream equals the first temperature, equals the second temperature or lies between the first temperature and the second temperature.

The temperature setting and the mechanical disturbance may be converted to the first valve PWM value and the second PWM value using a PWM look-up table. In one embodiment of the present teachings, the temperature setting and the mechanical disturbance are converted to a temperature count value and flow rate count value, respectively. A count-PWM look-up table is used, which provides a correlation between the temperature count value, flow rate count value, the first valve PWM value and the second PWM value. In another embodiment of the present teachings, a displacement-PWM look-up table is used, which provides a correlation between a temperature setting displacement value, a flow rate displacement value, the first valve PWM value and the second PWM value. The temperature setting displacement value, flow rate displacement value, in one embodiment of the present arrangements is an angular or rotational displacement value.

In a preferred embodiment of the present teachings, a step-PWM look-up table is used, which provides a correlation between temperature step value, flow rate step value, the first valve PWM value, and the second valve PWM value. Discussed above, the temperature step value and flow rate step value are calculated from the temperature count value and the flow rate count value, respectively.

A step 1406 includes generating, using a first valve PWM duty cycle register and a second valve PWM duty cycle register and based upon the first valve PWM value and the second valve PWM value, a first valve PWM duty cycle signal and a second valve PWM duty cycle signal. Referring to FIG. 12, first value duty cycle register 1206A receives first valve PWM value 1202 and generates the first valve PWM duty cycle register signal. Second value duty cycle register 1206B receives second valve PWM value 1232 and generates the second valve PWM duty cycle register value signal. In one embodiment of the present teachings, first value duty cycle register 1206A and second value duty cycle register 1206B receives and temporarily stores the first valve PWM value and the second valve PWM value, respectively.

Figure 16:
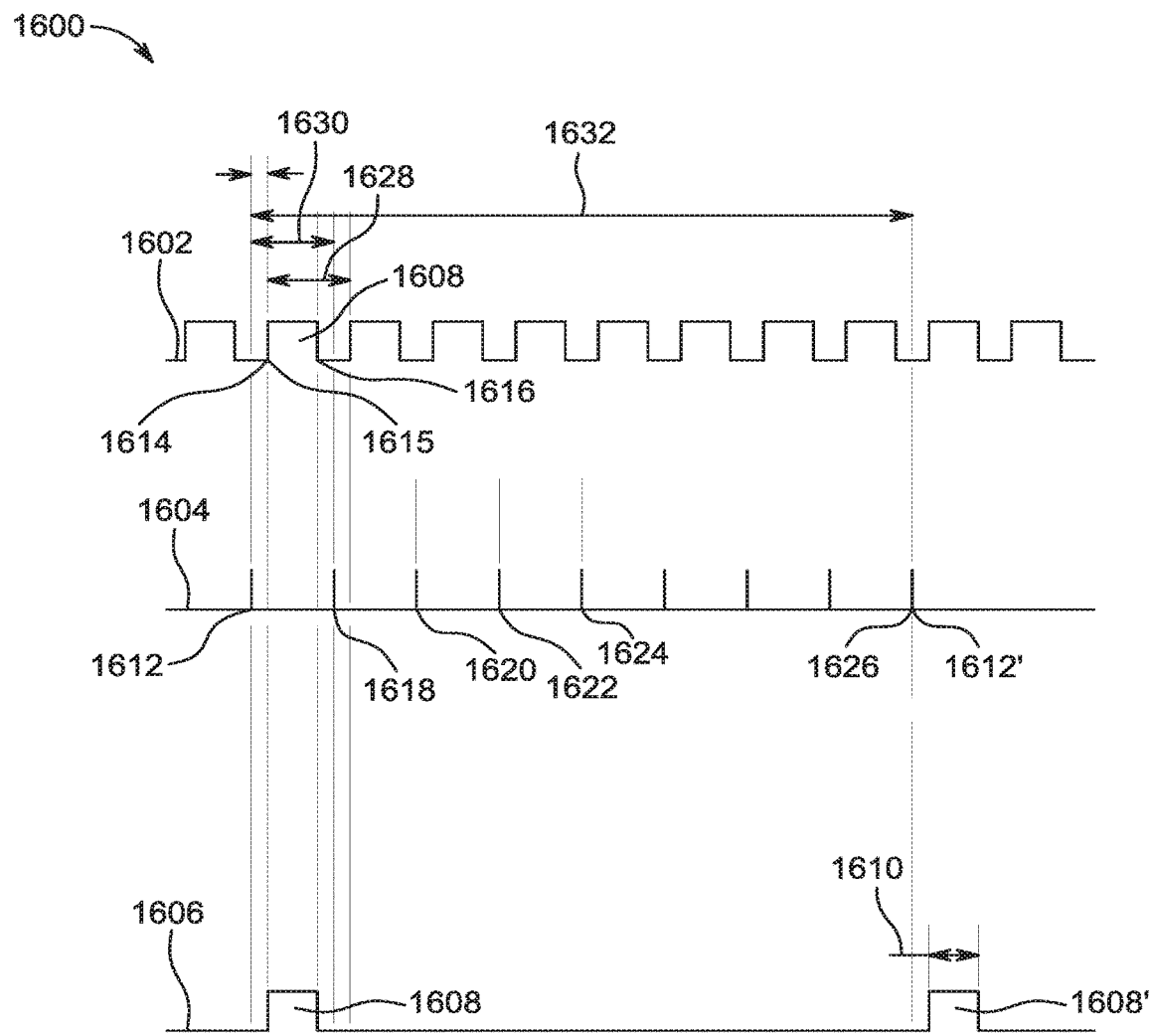
FIG. 16 shows a graphical representation of multiple pulse-related information, according to one embodiment of the present arrangements, produced by different hardware components.

Each of the first valve PWM duty cycle register signal and the second valve PWM duty cycle register signal includes, in one embodiment of the present teachings, an ON time initiation value (e.g., ON time initiation value 1615 of FIG. 16) and an OFF time deactivation value (e.g., OFF time deactivation value 1616 of FIG. 16). The ON time initiation value indicates when power from a power supply is initiated or activated. The OFF time deactivation value indicates when power from the power supply is deactivated or not active. In a preferred embodiment of the present teachings, the ON time initiation value is at a count or time of zero and the OFF time deactivation value is equivalent to the first or second valve PWM value. The period between ON time initiation value and the OFF time deactivation value is a pulse period (e.g., pulse period 1620 of FIG. 10).

Step 1406 is followed by a step 1408, which includes comparing, using a comparator, each of the first valve PWM value, the first valve PWM duty cycle register signal, and the second valve PWM value, and the second valve PWM duty cycle register signal, with a time counting register, which resides on a PWM timer, to implement the first valve PWM duty cycle register as a first valve PWM waveform and the second valve PWM duty cycle register as a second valve PWM waveform. A first valve comparator (e.g., first valve comparator 1208A of FIG. 12) receives the first valve PWM value and receives a time counting register from the PWM timer (e.g., PWM timer 1236 of FIG. 12). A second valve comparator (e.g., second valve comparator 1208B of FIG. 12) receives the second valve PWM value and receives the time counting register from the PWM timer.

The PWM timer has a predefined PWM timer period (e.g., PWM timer period 1628 of FIG. 16) that begins at a PWM timer initiation (e.g., PWM timer initiation 1614 of FIG. 16), where time is equal to zero, and ends at a PWM timer end value (e.g., PWM timer end value 1616 of FIG. 16). In one embodiment of the present teachings, the PWM timer period, is about 2.5 milliseconds. Moreover, the PWM timer has a predefined total count value for the PWM timer period. In a preferred embodiment of the present teachings, the predefined total count value for the PWM timer period is 1,024 counts. Therefore, the PWM timer counts from 0 to 1,023 during the PWM timer period. Following the final time value of the PWM timer period, the PWM timer resets and begins another PWM timer period.

Returning to step 1408 and using the first valve PWM module as an example, the first valve comparator matches the ON time of the first valve PWM duty cycle signal with the PWM timer initiation. FIG. 16 shows a graphical representation of multiple pulse-related information 1600 produced by different hardware components, such as timers and a PWM module. To generate a first valve PWM waveform 1604 (e.g., a first valve waveform and a second valve waveform), a PWM timer initiation 1614 matches to ON time initiation value 1615 of the first valve PWM duty cycle signa and the PWM timer begins counting. At ON time, power is provided to the first valve PWM module to form a beginning of a pulse 1608. The first valve comparator sequentially compares, starting from the PWM timer initiation value, the first valve PWM value to each PWM timer count value until the PWM timer count value is equal to first valve PWM value. When the PWM timer count value is equal to first valve PWM value, the OFF time deactivation value 1616 is met and the power is deactivated or stopped. For the remainder of the PWM timer period, no power is provided until another the next PWM timer period begins with the PWM timer reset time. A period time between the ON time and OFF time is a pulse width 1610. Pulse width 1610, when received by a motor, informs the motor regarding an amount to displace a valve to achieve the desired output fluid flow. A similar process occurs using the second valve PWM module.

Multiple iterations of step 1408 generate a first valve PWM waveform (e.g., first valve PWM waveform 1214A of FIG. 12 and PWM waveform 1602 of FIG. 16) and a second valve PWM waveform (e.g., second valve PWM valve waveform 1214B and PWM waveform 1602 of FIG. 16). Each PWM waveform includes multiple pulses 1608 of the same pulse width. The pulse width the first valve WPM waveform will remain the same unless the first valve PWM value, received at the first valve PWM module, changes.

Similarly, the pulse width the second valve WPM waveform will remain the same unless the second valve PWM value, received at the second valve PWM module, changes.

The method 1400 then proceeds to a step 1410. Step 1410 includes interrupting, using a gating timer (e.g., gating timer 1238 of FIG. 12) and a first valve PWM output control (e.g., first valve PWM output control 1210A of FIG. 12), output of the first valve PWM waveform to produce a filtered first valve control signal (e.g., filtered first valve control signal 1218A and filtered control signal 1606 of FIG. 16). Step 1410 further includes interrupting, using the gating timer and a second valve PWM output control (e.g., second valve PWM output control 1210B of FIG. 12), output of the second valve PWM waveform to produce a filtered second valve control signal (e.g., filtered second valve control signal 1218B and filtered control signal 1606 of FIG. 16). For illustrative purposes, first valve PWM output control will be used to describe the present teachings. The same teachings, embodiments, and implementation described using the first valve PWM output control may also be used with second valve PWM output control.

The gating timer has a predefined gating timer period (e.g., gating timer period 1630 of FIG. 16) that begins at a gating timer initiation (e.g., gating timer initiation 1612 of FIG. 16), where time=0, and ends at a predetermined gating timer final value. In one embodiment of the present teachings, the gating timer period is the same as the PWM timer period (e.g., about 2.5 milliseconds). Moreover, the gating timer has a predefined total count value for the gating timer period. In a preferred embodiment of the present teachings, the total count value for the gating timer period is 1,024 counts. The gating timer counts from 0 to 1,023 during each gating timer period. Following the final time value of the gating timer period, the gating timer resets and begins another gating timer period.

Referring again to FIG. 16, at each gating timer initiation 1612, 1618, 1620, 1622, and 1624 the gating timer provides an interrupt opportunity for first valve PWM output control to execute an enable or disable command 1604. Thus, for each gating timer initiation 1612, 1618, 1620, 1622, and 1624, the first valve PWM output control enables or disables output of the first valve PWM waveform from the first valve PWM output control. At gating timer initiation 1612, first valve PWM output control provides an enable command. First valve PWM output control enables output of any portion of first valve PWM waveform 1602 that is within gating timer period 1630. Thus, the first valve PWM output control enables output of a single pulse 1608, which is within gating timer period 1630, from first valve PWM waveform 1602.

At gating timer initiation 1618, 1620, 1622, and 1624, first valve PWM output control provides a disable command. For each length of gating timer period 1630 following gating timer initiation 1618, 1620, 1622, and 1624 first valve PWM output control disables output of first valve PWM waveform 1602. At gating timer initiation 1626, however, first valve PWM output control provides another enable command and enables output of another single pulse 1608, from first valve PWM waveform 1602.

During gating timer periods that follow the first valve PWM output control's disable commands, the present teaching recognize that additional functions may be executed. In one implementation of the present teachings, during gating time period 1630 following gating time initiation 1820, the processor calculates a new first valve PWM module value. During gating time period 1630 following gating time initiation 1822, the processor calculates a new second valve PWM value. During gating time period 1630 following gating time initiation 1624, the first valve PWM module writes the new first valve PWM value to the first valve PWM duty cycle register, and the second valve PWM module writes the new second valve PWM value to the first valve PWM duty cycle register.

In one embodiment of the present teachings, PWM timer period 1628 is offset than that of gating timer period 1630 such that a time of the PWM timer initiation is different than a gating timer initiation. In a preferred embodiment of the present teachings, the gating timer initiation is before the PWM timer initiation. In this implementation, all or at least a portion of pulse 1608 of first valve PWM waveform 1602 is within gating timer period 1630. In a more preferred embodiment of the present teachings, the gating timer initiation is about 250 microseconds before the PWM timer initiation. In another embodiment of the present teachings, a PWM timer period will not extend beyond that of the gating timer. In this configuration, the gating timer disables a portion of first valve PWM waveform 1602.

A signal period or signal frequency 1632 is defined by a period of time between gating timer initiation 1612 that is associated with an enable command and the next gating timer initiation 1612' that is associated with an enable command. As shown in FIG. 16, filtered first valve control signal 1606 includes a signal period 1632 that includes a single pulse 1608 from first valve PWM waveform 1602. The next signal period also includes a single pulse 1608' from first valve PWM waveform 1602.

The present teachings recognize that some motors (e.g., servomotors) operate when they receive a pulsed signal at a predetermined signal period 1632. In other words, the motor repeatedly receives a filter first control signal 1606 in which each signal period 1632 includes a single pulse 1608. In one embodiment of the present teachings, the signal period is about 20 milliseconds (i.e., 50 hertz).

A step 1412 includes implementing the filtered first valve control signal to displace, rotationally or angularly, a first valve stem associated with the first valve and the filtered second valve control signal to displace a second valve stem associated with the second valve. This displacement allows flow of the first fluid stream and/or the second fluid stream. In one implementation, the filtered first valve control signal is transmitted to a first motor and the filtered second valve control signal is transmitted to a second motor. The first motor, coupled to the first stem, displaces the first valve stem allowing flow of the first fluid stream through the first valve. The second motor, coupled to the second stem, displaces the second valve stem allowing flow of the second fluid stream through the second valve.

In another embodiment of the present teachings, the first valve PWM waveform is transmitted to a first motor and the second valve PWM waveform is transmitted to a second motor. Preferably, the first valve PWM output control and the second valve output control disabled portions of the first valve PWM waveform and/or portions of the second valve PWM waveform to generate a single pulse during each signal period.

Next, a step 1414 includes dispensing the output fluid stream having the desired temperature and the desired flow rate. The output fluid stream includes the first fluid stream, received from the first valve, and/or the second fluid stream, received from the second valve.

In one implementation of the present teachings, the first motor and the second motor are servomotors. They are substantially similar and operate simultaneously. As a result, the first valve PWM module and the second valve PWM module utilize with the same PWM timer. The pulse width of the filtered first valve control signal and the filtered second valve control signal, however, are controlled independently. The filtered first valve control signal uses an associated first valve PWM value and filtered second valve control signal uses an associated second valve PWM value.

In one aspect, the present teachings provide an override option. In one embodiment of the present teachings, the temperature sensing device is disabled and not used in calculating a first valve PWM value and a second valve PWM module. The first valve and second valve are opened an equal amount to generate an output fluid stream that has a desired flow rate.

In another embodiment of the present teachings, the flow rate setting device may be locked to a particular desired flow rate. The fluid dispensing system continues to provide an output fluid flow at the desired flow rate until a predetermined time has elapsed or until the user unlocks the flow rate setting device.

A servomotor pulse width, measured by function of time, is set by the manufacturer and varies from about 1 millisecond to about 2 milliseconds. To achieve desired valve adjustments between a full open position and a full closed position, a PWM timer period close in length to the servomotor control pulse width duration is preferable. This short pulse width period also is repeated at a signal frequency of about 50 hertz (i.e., about a 20 millisecond signal period) to properly position the servomotors to control the first valve and second valve. To achieve both the long period between pulses (about 20 milliseconds) and a high valve adjustment resolution within the short pulse period (about 1 millisecond to about 2 milliseconds), a gating timer is utilized. The gating time is utilized to enable and disable a first valve PWM waveform and to enable or disable a second valve PWM waveform. The gating timer is independent of the PWM timer, which controls the short duration pulse periods.

The gating timer and PWM timer have the same period of about 2.5 milliseconds but the gating timer and PWM timer initiation times are offset such that the gating timer starts before the PWM timer starts and the gating timer expires before the PWM timer expires. The offset time is about 0.25 milliseconds. The offset allows the gating timer to enable or disable at least a portion first valve PWM waveform and/or at least a portion of a second valve PWM waveform before the start and after the end of a pulse (i.e., between an ON time initiation value 1615 and an OFF time deactivation value 1516 of FIG. 16). With at least a portion first valve PWM waveform and/or at least a portion of a second valve PWM waveform disabled, the first valve and second valve PWM modules are still operating but first valve PWM waveform and/or the second valve PWM waveform is not sent to the servomotors. When at least a portion first valve PWM waveform and/or at least a portion of a second valve PWM waveform is enabled by the gating timer, the pulse is output to the servomotor.

A gating timer period of about 2.5 milliseconds creates about eight gating timer interrupts per an about 20 millisecond signal period. The first and second valve PWM waveform pulse is only enabled during the first 2.5 millisecond period. The remaining seven gating timers interrupt disables the first and second valve PWM waveform. The remaining gating timer interrupts are used for control functions within the computer and/or the first and second PWM modules to calculate and load the first and second PWM values for the signal period. In a preferred embodiment of the present teachings, the computer computes a new flow rate PWM value and temperature PWM value about every 100 milliseconds.

EXAMPLE 1

Example 1 provides exemplar steps for determining, based on a temperature count value and a flow rate count value, a temperature step value and a flow rate step value using a prototype of water-dispensing system (e.g., water-dispensing system 100 of FIG. 1A).

The prototype of water-dispensing system includes a temperature encoder and flow rate encoder. For each encoder, a maximum encoder count value and an operating angle value are known. The maximum encoder count is the number of counts the encoder is capable of determining in a 360 degree rotation. The operating angle is a range of angular rotation the encoder may encounter during an operative state. Preferably, the range of angular rotation of the temperature encoder is substantially the same as a range of angular rotation provided by a temperature controller (e.g., temperature controller 116 of FIG. 1A). Likewise, the range of angular rotation of the flow rate encoder is substantially similar to the angular rotation of the flow rate controller (e.g., flow rate controller 106 of FIG. 1A).

The temperature encoder had a maximum encoder count of 4,095 and an encoder operating angle of 90 degrees. The flow rate encoder had a maximum encoder count of 4095 and an encoder operating angle of 60 degrees.

In this example, a computer (e.g., computer 120 of FIG. 1B) receives, from a flow rate encoder, a flow rate count value of 156 and, from a temperature encoder, a temperature count value of 84. In determining the flow rate step value and temperature step value, a full-scale count range is first determined. The full-scale count range is the number of encoder counts available within the encoder's operating angle and is determined using the formula:

$$\text{Full Scale Count Range} = \frac{\text{encoder operating angle}}{360°} \times \text{max encoder count} \quad \text{(Equation 1)}$$

Thus, for temperature and flow rate, the full-scale count range is:

$$\text{Temperature full scale count range} = \frac{90°}{360°} \times 4,095 = 1,023.75 \text{ counts}$$

$$\text{Flow rate full scale count range} = \frac{60°}{360°} \times 4,095 = 682.5 \text{ counts}$$

Next, the full-scale count ranges of temperature control encoder and the flow rate encoder were each subdivided into sequential steps. The number of steps represents a number of discrete valve positions associated with the temperature control encoder and the flow rate encoder. By way example, if there are (m) number of temperature steps and (n) number of flow rate controller steps, an [n×m] array of discrete valve positions is created. The number of steps for flow rate and temperature is user defined. The number of steps is a design choice and may depend on memory capacity and processing capabilities associated with computer 120, and how many minute valve positions may be necessary to adjust fluid flow and temperature.

In this example, the prototype water-dispensing system had 30 temperature steps for temperature control and 110 flow rate steps for flow rate control. As a result, there were 3,300 (i.e., 110×30=3,300) discrete valve positions to adjust water temperature and water flow rate.

The counts per step for each encoder was determined using the following formula:

$$\text{Encoder counts per step} = \frac{\text{full scale count range}}{\text{number of steps}} \quad \text{(Equation 2)}$$

In this example, for the temperature control encoder and flow rate encoder, the encoder counts per step were:

$$\text{Temperature control encoder counts per step} = \frac{1023.75}{30} = 34.125$$

$$\text{Flow rate encoder counts per step} = \frac{682.5}{310} = 2.202$$

Using counts per step for the temperature control encoder and the flow rate encoder, the computer calculated a temperature step value and a flow rate step value using the following formula:

$$\text{Step value} = \frac{\text{Count value}}{\text{Encoder counts per step}} \quad \text{(Equation 3)}$$

The step value for temperature and flow rate were:

$$\text{Temperature step value} = \frac{84}{8.33} = 10.08 \approx 10$$

$$\text{Flow rate step value} = \frac{156}{2.202} = 50.27 \approx 50$$

Those skilled in the art computer computations recognize that for integer values, a computer rounds down to the nearest integer value. Thus, computer 120 determined that the temperature count value of about 84, received from the temperature control encoder, had a corresponding temperature step value of 10; and the flow rate count value of 156, received from the flow rate encoder, had a flow rate step value of 50.

EXAMPLE 2

Example 2 provides exemplar steps for determining, based on a flow rate step value and a temperature step value, a first valve PWM value and a second valve PWM value (i.e., step 1310 of FIG. 13) using a prototype of water-dispensing system (e.g., water-dispensing system 100 of FIG. 1A).

Figure 17:
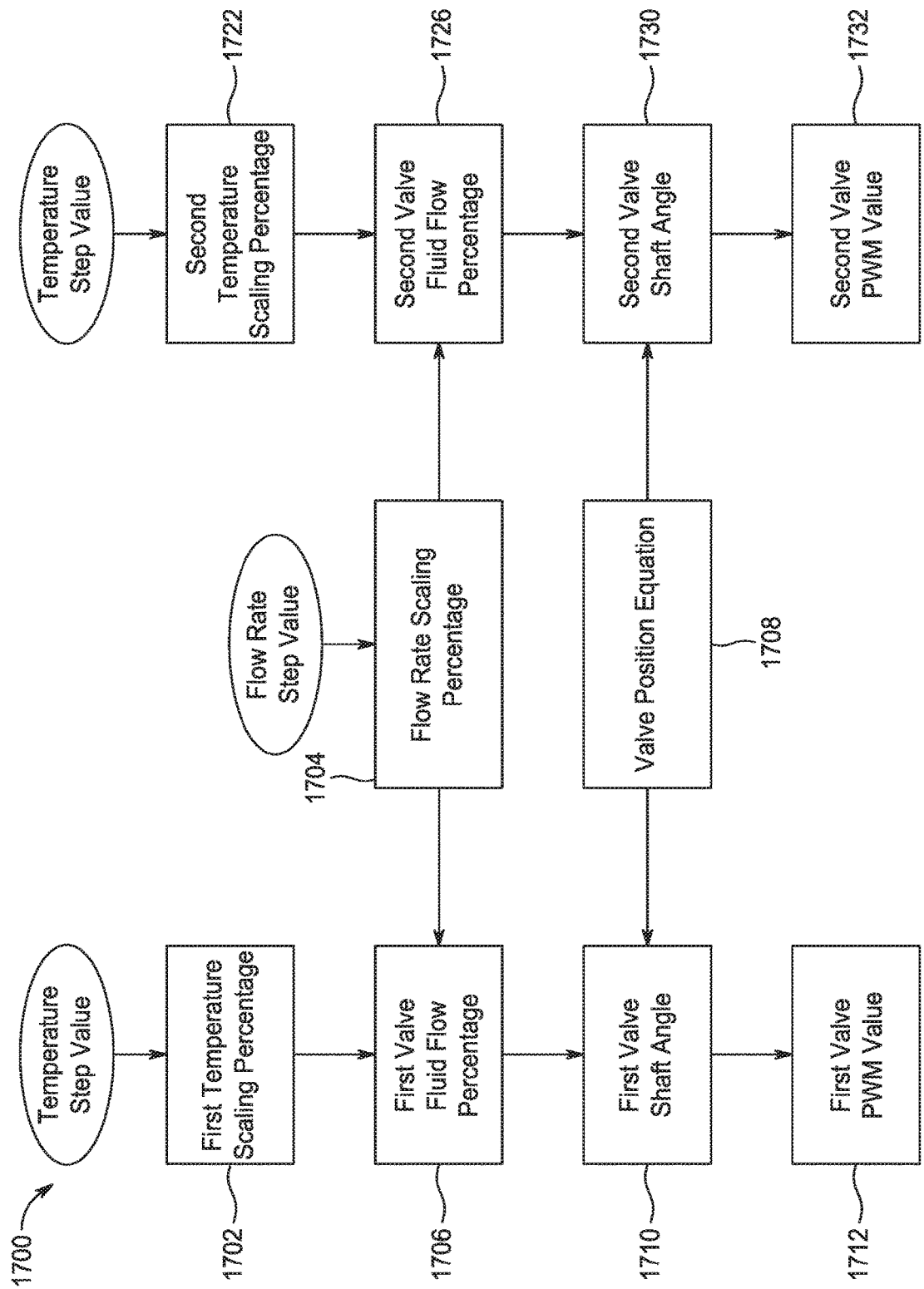
FIG. 17 shows a flow chart, according to one embodiment of the present teachings, for determining a first valve PWM value and a second valve PWM value using a temperature count value and a flow rate count value, respectively.

FIG. 17 shows a Flow chart 1700 for calculating, using a flow rate step value and a temperature step value, the first PWM value and the second PWM value. In determining the first PWM value and the second PWM value, a percentage of the total fluid flow, dispensed from water-dispensing system 100, that will be of the first temperature is determined. This fluid flow percentage, which traverses though the first valve, is referred to as a "first temperature scaling percentage" and is denoted by reference numeral 1702 of FIG. 17. Similarly, a percentage of the total fluid flow, dispensed from water-dispensing system 100, that will be of the second temperature is determined. This fluid flow percentage, which traverses though the second valve, is referred to as a "second temperature scaling percentage" and is denoted by reference numeral 1722 of FIG. 17. The first and second valve temperature scaling percentage 1702 and 1722, respectively were calculated:

$$\text{first temperature scaling \%} = \quad \text{(Equation 4)}$$
$$\left(\frac{\text{temp. step value}}{\text{max. temp. step value}}\right) \times 100\%$$

$$\text{second temperature scaling \%} = \quad \text{(Equation 5)}$$
$$\left(\frac{\text{max. temp. step value} - \text{temp. step value}}{\text{max. temp. step value}}\right) \times 100$$

Using the temperature step value of 10, derived above, the first and second temperature scaling percentage, respectively, are calculated:

$$\text{first temperature scaling \%} = \left(\frac{10}{30}\right) * 100 = 33.333\%$$

$$\text{second temperature scaling \%} = \left(\frac{30-10}{30}\right) * 100 = 66.637\%$$

Thus, at temperature step value 10, 34.5% of the total fluid flow, dispensed from water-dispensing system, that was of the first temperature and 65.5% of the total fluid flow that was of the second temperature.

Figure 18:
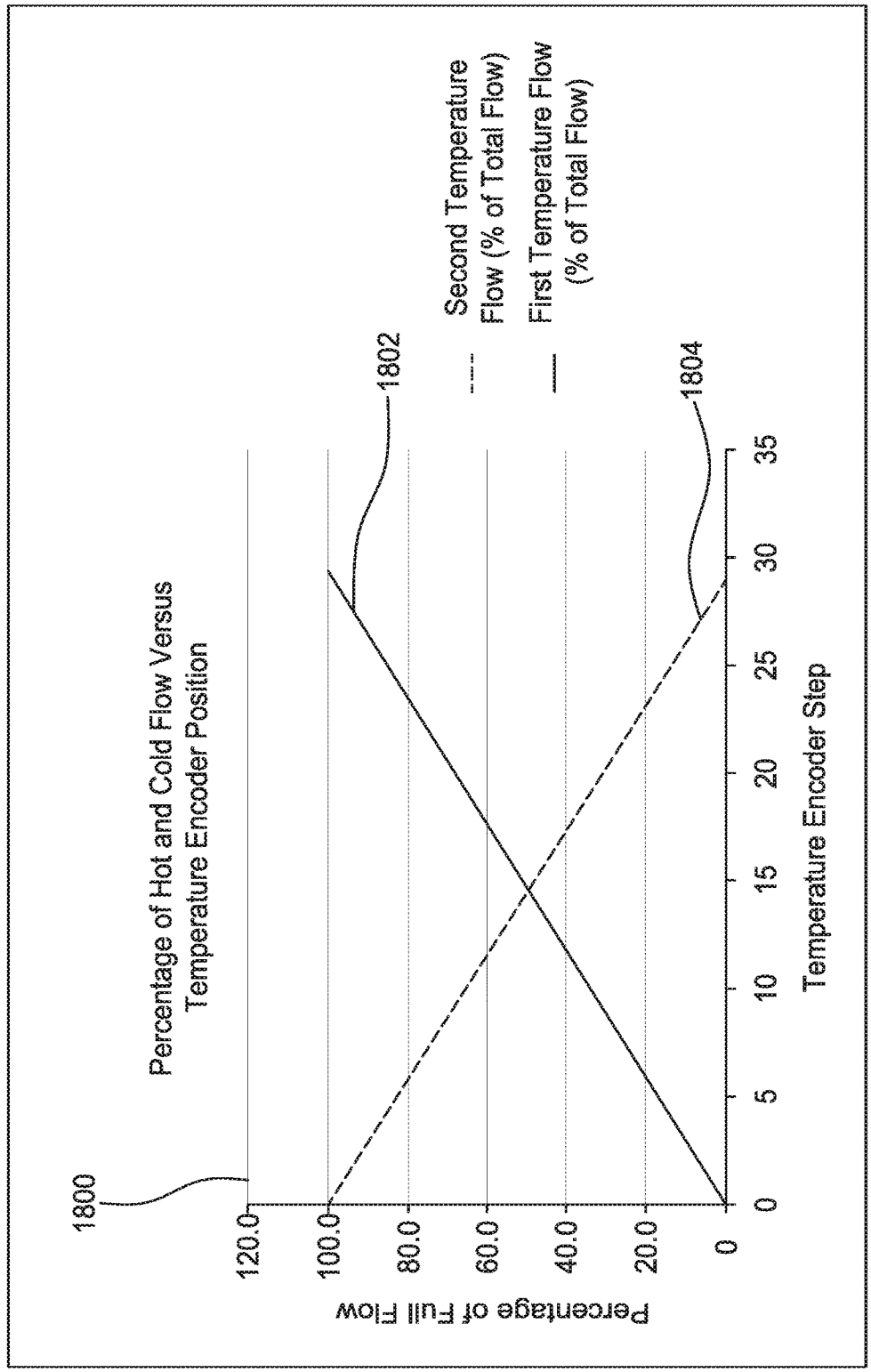
FIG. 18 shows a valve flow rate graph, according to one embodiment of the present teachings, for determining a first valve fluid flow rate and a second valve fluid flow rate, each of which will be in the process flow chart of FIG. 17.

Graph 1800 of FIG. 18 provides another method for identifying the first and second valve temperature scaling percentages, respectively. As discussed above, there are 30 temperature step values for adjusting temperature in water-dispensing system. The horizontal axis of graph 1800 has 30 discrete temperature step values, starting with a temperature step value of 0 and ending with a temperature step value of 29. The vertical axis provides a percentage of total fluid flow between 0% and 100%. The first temperature line 1802 shows a linear relationship between a temperature step value and a percentage of first temperature fluid in the total fluid flow dispensed by the second. The linear relationship shown in fist temperature line 1802 may be characterized as an algebraic function. By way of example, first temperature line 1802 may be characterized as y=3.45x, where x is the temperature step value.

Similarly, the second temperature line 1804 shows a linear relationship between a temperature step value and a percentage of the second fluid temperature in the total fluid flow desired admixed fluid steam. Second temperature line 1804 may be characterized as y=−3.45x+100, where x is the temperature step value.

Using FIG. 18 or the associated functions, a temperature step value of 10 instructs water-dispensing system to release about 34.5% of total fluid flow from the first valve and about 65.5% of total fluid flow from second valve 138. In other words, about 34.5% of the total fluid flow may be fluid of a first temperature, and about 65.5% of the total fluid flow may be fluid of a second temperature, to produce the fluid temperature desired by the user.

A flow rate scaling percentage 1704 was also determined. The flow rate scaling percentage 1704 is a percentage of the water dispensing system's maximum flow rate. The flow rate scaling percentage 1704 is the combined flow rates from the first valve (e.g., first valve 128 of FIG. 1B) and the second valve 138 (e.g., first valve 138 of FIG. 1B). The flow rate scaling percentage 1704 is calculated using the flow rate step value and provides the flow rate desired by the user when the user exerts a force on a force-receiving feature (e.g., pressure plate 776 of FIG. 7).

$$\text{Flow rate scaling percentage} = 100 \times \left(\frac{\text{flow rate step value} + \text{offset} - 1}{\text{maximum flow rate step value} + \text{offset} - 1}\right) \quad \text{(Equation 6)}$$

The offset value is a design choice and is included in the formula to ensure that, when a when the valve is not engaged, a leak-poof seal prevents fluid flow from leaking through a closed valve. When a user engages the flow rate controller, a sealing feature of the valve moves an amount that corresponds with the offset value before the valve dispenses fluid flow.

Returning to this example, the offset=19. As described above, the flow rate step value was 10 and the maximum flow rate step value is 110. Thus, for a flow rate step value of 10, the combined flow rate scaling percentage for the first and second valve was:

$$\text{Flow rate scaling percentage} = 100 \times \left(\frac{50 + 20 - 1}{110 - 1 + 20}\right) = 53.488\%$$

For a flow rate step valve of 10, water flow rates from first valve 128 and second valve 138 combined to provide 53 of the total flow rate water-dispensing system 100 was capable of producing.

Using first temperature scaling percentage 1702 and flow rate scaling percentage 1704, first valve fluid flow percentage 1706 was calculated. Similarly, using second temperature scaling percentage 1722 and flow rate scaling percentage 1704, a second valve fluid flow percentage 1726 was calculated using the following formula:

$$\text{valve fluid flow \%} = \left(\frac{\text{temperature scaling \%}}{100} \times \frac{\text{flow rate scaling \%}}{100}\right) \times 100 \quad \text{(Equation 7)}$$

Thus, the percentage of total fluid flow dispensed by water-dispensing system 100 that traverses through first valve 128 was:

$$\text{first valve fluid flow \%} = \left(\frac{33.33\%}{100} \times \frac{53.488\%}{100}\right) \times 100 = 17.829\%,$$

and the percentage of the total fluid dispensed by water-dispensing system 100 that traverses through second valve 138 was:

$$\text{second valve fluid flow \%} = \left(\frac{66.67\%}{100} \times \frac{53.488\%}{100}\right) \times 100 = 35.660.$$

In this example, the first valve dispenses, at first temperature, 17.829% of the total fluid flow the first valve was capable of dispensing and the second valve dispense, at the second temperature, 35.66% of the fluid flow the second valve is capable of dispensing.

A valve shaft angle 1408 was also determined. A valve shaft angle equation provides a correlation between a valve shaft angle and a percentage of total water flow through a valve. In this example, the first valve and the second valve are substantially similar and, therefore, have a similar valve position equation. Thus, the same valve position equation was used to determine the first and second valve shift angles.

Figure 19:
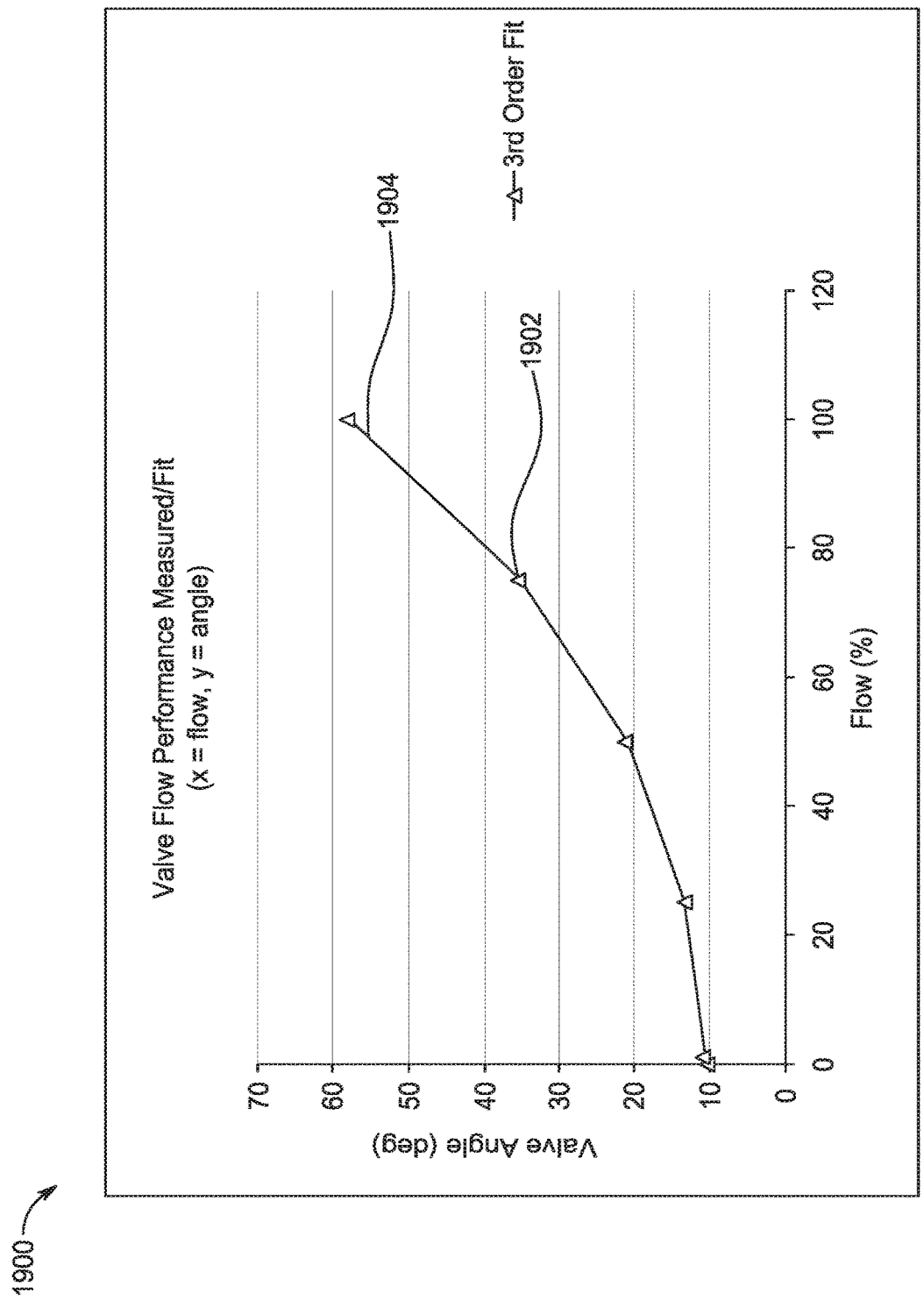
FIG. 19 shows a valve position graph, according to one embodiment of the present teachings, for determining a valve position equation, which will be used in the process flow chart of FIG. 17.

Through experimentation, the valve was rotated to different positions that increased or reduced the aperture through which fluid traversed through the valve and flow rate percentage was determined. FIG. 19 shows graph 1900 having multiple data points 1902 at various valve shaft angles that were acquired using the prototype water-dispensing system. The valve angle, measured in degrees, is an angular difference between a first, non-operational, valve position having a first angular value, and a second, engaged position having a second angular value. The first valve position does not allow fluid flow through the valve.

Using the combination of data points 1902, a polynomial function was determined to describe the relationship between valve shaft angle and percentage of total flow rate. In this example, a third order polynomial 1904 (i.e., $y=aX^3+bx^2+cx+d$) provided a close relationship between valve shaft angle and percentage of total water flow through a valve. While a third order polynomial provided an accurate function for percentage of total water flow in relation to valve shaft angle, the present teachings are not so limited. A first, second, fourth, or fifth order polynomial may also be used. In this example, the function shown in FIG. 14 was:

$$y = 1.98 \times 10^{-5} x^3 + 0.002378 x^2 + 0.04075 x + 10.549 \quad \text{(Equation 8)}$$

where x is total percentage of flow through the valve, and y is valve angle value.

Using first valve fluid flow percentage 1706 and valve position equation 1708, a first valve shaft angle 1710 was determined. Similarly, a second valve shaft angle is determined using second valve fluid flow percentage 1726 and valve position equation 1708. Continuing example 2, the valve shaft angle for the first valve was determined to be:

first vavle shaft angle =

$$1.98 \times 10^{-5} \times 17.83 + 0.002378 \times 17.8^2 + 0.04075 \times 17.8 + 10.549 = 12.14°$$

The valve shaft angle for the second valve second vavle shaft angle = $1.98 \times 10^{-5} \times 35.66^3 +$ $$0.002378 \times 35.66^2 + 0.04075 \times 35.66 + 10.549 = 15.92°.$$

Using the first valve shaft angle 1710 and second valve angle 1730, a first valve PWM value 1318 and second valve PWM value was determined using the formula:

$$PWM \text{ value} = \left(\left(\% \text{ PWM full closed} - \left(\frac{\text{valve shaft angle}}{\text{max. valve shaft angle}} \times \% \text{ PWM full closed}\right)\right) \times \frac{PWM \text{ range}}{100}\right) + \min. PWM \quad \text{(Equation 9)}$$

wherein "maximum valve shaft angle" is the angle that allows for 100 percent fluid flow, "% PWM full closed" is a percentage of the PWM value range that corresponds to a fully seated or closed valve position, "PWM range" is difference between a maximum PWM value and a minimum PWM value, and "PWM min" is a PWM value that corresponds to the valve in full open position (i.e., maximum fluid flow through the valve). In other words, the PWM min value generates a pulse width that is substantially similar a servomotor pulse width representing a valve in a full open position. In this example, the servomotor pulse width representing a valve in the full open position is about 1 milliseconds. A "PWM max" is a PWM value that corresponds to the valve in full closed position (i.e., maximum fluid flow through the valve). The PWM max value generates a pulse width that is substantially similar a servomotor pulse width representing a valve in a full open position. In this example, the servomotor pulse width representing a valve in the full open position is about 2 milliseconds.

The present teachings recognize that these variables are well understood in the field of PWM modules and servomotor communications and may depend on a PWM modules type, servomotor type and/or design choices for a particular implementation. The prototype water-dispensing system had a PWM min was equal to about 491, which generates a pulse width of about 1.313 milliseconds, the PWM max was equal to about 772, which generates a pulse width of about 2.063 milliseconds. The PWM range was equal to about 281. A maximum valve shaft angle is determined from valve position equation 1304 and FIG. 14. Thus, $$\text{First valve } PWM \text{ value} = \left(\left(100 - \left(\frac{12.14}{60} \times 100\right)\right) \times \frac{281}{100}\right) + 491 = 715.1 \approx 715$$

$$\text{Second valve } PWM \text{ value} = \left(\left(100 - \left(\frac{15.62}{60} \times 100\right)\right) \times \frac{281}{100}\right) + 491 = 697.4 \approx 697$$

As shown in Table 15, a flow rate step value of 50 and a temperature step value of 10 provides a first valve PWM value of 715 and a second valve PWM value of 697. For any combination of temperature step value and flow rate step value, the steps described in FIG. 17 may be used to calculate the first valve PWM value and second valve PWM value. In a preferred embodiment of the present teachings, the correlation between a temperature count value and its associated temperature step is obtained from a predefined lookup table stored in memory. Similarly, a correlation between a flow rate count value and its associated flow rate step value is obtained from the lookup table stored in memory.

Although illustrative embodiments of the present teachings and arrangements are shown and described in terms of dispensing an output fluid stream, other modifications, changes, and substitutions are intended. Accordingly, it is appropriate that the disclosure be construed broadly and in a manner consistent with the scope of the disclosure, as set forth in the following claims.

What is claimed is:

1. A method for dispensing an output fluid stream, said method comprising:
   receiving, from a temperature setting device, a desired temperature setting of said output fluid stream;
   converting, using a temperature encoder, said desired temperature setting to a temperature count value, wherein said temperature encoder is communicatively coupled to said temperature setting device;
   receiving, from a flow rate setting device, a desired flow rate setting of said output fluid stream;
   converting, using a flow rate encoder, said desired flow rate setting to a flow rate count value, wherein said flow rate encoder is communicatively coupled to said flow rate setting device;
   computing, using a processor and based upon said temperature count value and said flow rate count value, a first valve pulse width modulation value ("PWM") and, based upon said temperature count value and said flow rate count value, a second valve PWM value;
   translating said first valve PWM value to a first PWM signal and said second valve PWM value to a second PWM signal;
   conveying said first PWM signal to a first motor;
   conveying said second PWM signal to a second motor; and
   wherein said first motor is configured to activate a first valve to dispense a first fluid flow at a first fluid flow rate and said second motor is configured to activate a second valve to dispense a second fluid flow at a second fluid flow rate.

2. The method for dispensing an output fluid stream of claim 1, further comprising:
   activating, using said first PWM signal, a first motor to open a first valve to produce said first fluid flow at said first fluid flow rate; and
   activating, using said second PWM signal, a second motor to open a second valve to produce said second fluid flow at said second fluid flow rate.

3. The method for dispensing an output fluid stream of claim 2, further comprising:
   mixing said first fluid flow at said first fluid flow rate and said second fluid flow at said second fluid flow rate to produce said output fluid stream; and
   dispensing said output fluid stream at said desired temperature and at said desired flow rate, and wherein temperature of said first fluid flow is not the same as that of said second fluid flow.

4. The method for dispensing an output fluid stream of claim 1, wherein said receiving said desired temperature setting includes receiving a temperature-setting force at said temperature setting device, that is applied by a user desiring said output fluid stream of a desired temperature, wherein said temperature-setting force translates into rotational or angular displacement of at least a portion of said temperature setting device.

5. The method for dispensing an output fluid stream of claim 1, wherein said receiving said desired flow rate setting includes receiving a flow-rate setting force at said flow rate setting device, that is applied by a user desiring said output fluid stream of a desired flow rate, wherein said flow-rate setting force translates into rotational or angular displacement of at least a portion of said flow rate setting device.

6. The method for dispensing an output fluid stream of claim 1, wherein converting said desired temperature setting to said temperature count value includes:
   identifying, using said temperature encoder, a degree of rotational or an angular displacement of at least a portion of said temperature setting device from a reference location; and
   converting said degree of rotational or said angular displacement to said temperature count value by multiplying said degree of rotational or angular displacement and a ratio of total count value to 360 degrees, wherein said total count value corresponds to a count value realized when said angular displacement equals 360 degrees.

7. The method for dispensing an output fluid stream of claim 1, wherein said computing includes:
   obtaining a temperature count per step value and a flow rate count per step value;
   dividing said temperature count value, using a processor, by said temperature count per step value to generate a temperature step value;
   dividing said flow rate count value, using a processor, by said flow rate count per step value to generate a flow rate step value; and
   determining, using a look-up table, said first valve PWM value and said second valve PWM value, wherein said look-up table provides a correlation between said temperature step value, said flow rate step value, said first valve PWM and said second valve pulse PWM value such that for a selected temperature step value and a selected flow rate step value, said look-up table provides a resulting first valve PWM value and a resulting second valve PWM value.

8. The method for dispensing an output fluid stream of claim 7, wherein said obtaining said temperature count per step value and said flow rate count per step value includes:
   obtaining a full-scale count range of temperature values and a total number of temperature step values for said temperature encoder, wherein said full-scale count range of temperature values is divided into a predetermined number of individual temperature step values such that addition of each of said individual temperature step values results in said total number of temperature step values;
   obtaining a full-scale count range of flow rate values and a total number of flow rate step values for said flow rate encoder, wherein said full-scale count range of flow rate values is divided into a predetermined number of individual flow rate step values such that addition of each of said individual flow rate step values results in said total number of flow rate step values;
   dividing full-scale count range of temperature values by said total number of temperature step values to arrive at a flow rate counts per step value;
   dividing full-scale count range of flow rate values by said total number of flow rate step values to arrive at a temperature counts per step value;
   dividing said temperature count value by said temperature counts per step value to arrive at said temperature count per step value; and
   dividing said flow rate count value by said flow counts per step value to arrive at said temperature count per step value.

* * * * *